(12) United States Patent
Kinjo

(10) Patent No.: US 7,145,597 B1
(45) Date of Patent: Dec. 5, 2006

(54) METHOD AND APPARATUS FOR IMAGE PROCESSING

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 657 days.

(21) Appl. No.: 09/697,739

(22) Filed: Oct. 27, 2000

(30) Foreign Application Priority Data

Oct. 28, 1999 (JP) .................................. 11-306600
Dec. 17, 1999 (JP) .................................. 11-358595

(51) Int. Cl.
*H04N 5/228* (2006.01)
*G03B 17/24* (2006.01)

(52) U.S. Cl. .............................. 348/222.1; 348/231.3; 348/231.4; 396/311

(58) Field of Classification Search ............. 348/222.1, 348/207.99, 333.02, 333.12, 223.1, 264, 348/260, 266; 396/311, 312, 168
See application file for complete search history.

(56) References Cited

U.S. PATENT DOCUMENTS

| | | | | | |
|---|---|---|---|---|---|
| 5,128,708 | A | * | 7/1992 | Murayama et al. | 396/168 |
| 5,296,884 | A | * | 3/1994 | Honda et al. | 396/311 |
| 5,461,439 | A | * | 10/1995 | Minakuti et al. | 396/311 |
| 5,594,513 | A | * | 1/1997 | Stone et al. | 352/6 |
| 5,913,078 | A | * | 6/1999 | Kimura et al. | 396/50 |
| 5,966,553 | A | * | 10/1999 | Nishitani et al. | 396/303 |
| 6,064,433 | A | * | 5/2000 | Bush et al. | 348/364 |
| 6,201,571 | B1 | * | 3/2001 | Ota | 348/239 |
| 6,421,470 | B1 | * | 7/2002 | Nozaki et al. | 382/321 |
| 6,657,658 | B1 | * | 12/2003 | Takemura | 348/207.99 |

FOREIGN PATENT DOCUMENTS

| | | |
|---|---|---|
| JP | 08-036226 | 2/1996 |
| JP | 09-037203 | 2/1997 |
| JP | 11-239269 | 8/1999 |

\* cited by examiner

*Primary Examiner*—Lin Ye
(74) *Attorney, Agent, or Firm*—Morgan, Lewis & Bockius, LLP

(57) ABSTRACT

The image processing method and apparatus capture image data of a photographing scene in which a subject is photographed with a camera, as well as, capture camera information acquired or input in the camera when the subject is photographed, further optionally obtain related information related to the photographing scene, assume the photographing scene by at least one of the camera information and the related information or by a combination with the digital image data and at least one of these information and subject preset image processing depending on the assumed photographing scene. The image processing method and apparatus are capable of obtaining a high quality image such as a high image quality print by assuming a photographing scene and executing optimal gradation control, restoration processing and image quality improvement depending on the assumed photographing scene.

57 Claims, 6 Drawing Sheets

METHOD AND APPARATUS FOR IMAGE PROCESSING

BACKGROUND OF THE INVENTION

1. Field of the Invention

The present invention relates to a method and an apparatus for image processing that utilize photographing information such as a photographing data and time, and camera information such as photographing position information, photographing direction information, photographing magnification information and message information.

In addition, the present invention relates to a method and an apparatus for image processing that are utilized in a digital photoprinter and the like for photoelectrically reading an image of a film, or directly receiving a digital image, thereby obtaining a (photographic) print on which this image is reproduced or an image data recording medium (hereinafter simply referred to as "image recording medium) having the reproduced image data recorded thereon, or performing network distribution.

2. Description of the Related Art

In recent years, a camera or recording various kinds of photographing information in a photo film, and a camera having the Global Positioning System (GPS) function for determining a current position based on a signal from a satellite and recording a date and time as well as a place together with a photo when photographing is performed have been developed.

By using a camera recording these various kinds of information, a high quality print can be obtained that gives full play to the function of the camera and performance of a light-sensitive material utilizing the various kinds of photographing information.

For example, the Japanese Patent Application Laid-open No. Hei 9-37203 discloses a method for, in addition to displaying a photographing location and the like on a photographed image together with the image based on the GPS function, specifying a position of sun light and the like at the time of photographing, determining whether the photographing is backlighted or not against the sun light from sun position information and photographing luminance information, and adjusting density and color balance of a photographed image by combining to use a photographing location, a photographing direction, other photographing information and so forth.

In addition, the Japanese Patent Application Laid-open No. Hei 8-36226 discloses a method for classifying into groups of photographed images by information on a photographing date and time, a photographing location, whether an electronic flash is used or not, an exposure amount, and a printing size, and setting printing conditions for each croup.

For example, there are a method for forming groups by classifying photographing dates and times in light of predetermined conditions and controlling exposure corresponding to groups that are determined to have an identical photographing date and time, and a method for forming groups according to photographing location information acquired by the GPS system and controlling gradations and exposure corresponding to groups that are determined to have an identical photographing location.

However, the method disclosed in the Japanese Patent Application Laid-open No. Hei 9-37203 can display a photographing location but does not have any measures for density failures and color failures other than backlight, and therefore, has a problem that appropriate image reproduction corresponding to the photographing scene is not necessarily possible.

In addition, the method disclosed in the Japanese Patent Application Laid-open No. 8-36226 is arranged to control exposure according to various kinds of photographing information such as a photographing date and time as well as a photographing location but, since exposure is not controlled by assuming a subject or a photographing scene itself, there is a problem that the control of exposure cannot be changed according to whether a photographing location is indoors or outdoors, whether a subject is a person or a scenery, and so forth, and appropriate image reproduction corresponding to the photographing scene is not possible as well.

Moreover, since appropriate gradation control corresponding to a photographing scene is not possible, there is a specific problem as described below.

That is, while color failure measures are taken in order to prevent a reproduction print from getting greeny by illumination light, there is a problem that a color green cannot be represented well if the color failure measures are applied to photographing outdoors (for example, especially in a forest region).

Furthermore, there are problems that a black part in an image photographing a nightscape becomes thin and flat, and that, when a snowscape is photographed, white snow becomes gloomy, and so forth.

On the other hand, when a film image is read using visible light, a film scanner and the like are commercially available that are capable of detecting and correcting a dust and a tarnish by reading the film image using infrared ray light in addition to visible light. However, in order to read a film image using infrared ray light, there is a problem that hardware increases such as an infrared ray light emitting light source.

In addition, also commercially available are software and the like for acquiring an image read as digital image data in a personal computer (PC) and the like, displaying the image on a monitor and the like, and manually removing an unnecessary object such as a wire in the mage displayed on the monitor. However, since the removal of unnecessary objects such as erasing wires by such a commercially available software is manually corrected while an operator looks at a monitor display of the PC, there is a problem that this is time consuming and complicated.

Incidentally, as printing of an image photographed on a photo film (hereinafter referred to as film) such as a negative film, a reversal film and the like onto a light-sensitive material (a photograph paper) a so-called direct exposure (an analog exposure) is conventionally the main stream that projects an image of the film on the light-sensitive material and performs areal exposure of the light-sensitive material. On the other hand, in recent years, a printing apparatus utilizing digital exposure is practically used, that is, a digital photoprinter for photoelectrically reading an image recorded in the film; converting the read image into a digital signal, which is then subjected to various kinds of image processing to produce recording image data; a light-sensitive material is exposed by scanning with recording light modulated in accordance with the image data, thereby recording an image (latent image) which is then processed photoelectrically to produce a (finished) photographic print.

Since the digital photoprinter can process an image as digital image data, it can compose a plurality of images and divide an image, and also can compose characters with the image data processing, which enables output of prints that are freely edited/processed according to uses. Moreover, since the digital photoprinter can not only output an image as a print (a photo), but also can supply image data to a computer and the like or store image data in a recording medium such as a floppy disk, the image data can be utilized for various uses other than a photograph.

As described above, the digital photoprinter photoelectrically reads an image of a film, converts the image to digital image data (density data), and grasps the state of the image by analyzing the image data, thereby sets image processing conditions according to the image. Then, the digital photoprinter acquires image data for output with regulated exposure conditions in printing by processing the image data according to the image processing conditions.

Thus, the digital photoprinter preferably performs correction of dropouts and blocked-ups of an image attributable to backlight, an electronic flash photographing and the like, processing of sharpness, correction of color or density failures and so forth, thereby can obtain a high-definition print on which a high quality image is reproduced that cannot be obtained with a conventional direct exposure.

However, since a sort of an image to be photographed in a film is not fixed, but may be various scenes such as a person, a scenery, a flower, and the like, even if image processing conditions are set by analyzing image data that is acquired by photoelectrically reading an image of a film, image processing conditions appropriate for the image might not be necessarily acquired.

On the other hand, there has been conventionally proposed a digital photoprinter that not only analyzes image data but also acquires information representing a photographing scene (scene information) to set image processing conditions according to various scenes.

For example, the Japanese Patent Application Laid-open No. Hei 11-239269 discloses a digital photoprinter that gives scene information to each frame of an image in advance, acquires the scene information together with the image, and adopts an optimized image processing algorithm for each scene in print processing, thereby sets image processing conditions according to the scene information.

Further, scene information here includes, for example, a person, a flower, a scenery, a nightscape, an interior, fireworks, snow, a setting sun, a still life and the like, and is designated by a photographer from a camera at the time of photographing and given to the image by magnetically and optically recording outside an image region of each frame of a film.

However, the above-mentioned digital photoprinter disclosed in the Japanese Patent Application Laid-open No. Hei 11-239269 has problems that a photographer has to take the trouble to input scene information at the time of photographing, which is complicated and is a considerable burden for the photographer, and that, since a piece or scene information to be inputted is limited as being selected from those set in the camera in advance, the camera cannot necessarily cope with all the scenes.

SUMMARY OF THE INVENTION

The present invention has been devised in view of the above drawbacks of the conventional art and it is a first object of the present invention to provide an image processing method that is capable of obtaining a high quality print by assuming a photographing scene and controlling gradation optionally depending on the assumed photographing scene as well as an image processing apparatus for implementing this method.

In addition, the present invention has been devised in view of the above drawbacks of the conventional art and it is a second object of the present invention to provide an image processing method that is capable of preparing a simulation image of a photographing scene and efficiently modifying a dust, a tarnish and a noise, correcting density unevenness and unsharpness, and removing an unnecessary object as well as an image processing apparatus for implementing this method.

Moreover, the present invention has been devised in view of the above drawbacks of the conventional art and it is a third object of the present invention to provide an image processing method that is capable of obtaining a high quality image utilizing supplementary information on a photographing scene to an image without making an photographer aware of the quality improvement as well as an image processing apparatus for implementing this method.

In order to attain the first, second and third objects described above, the present invention provides an image processing method, comprising the steps of capturing digital image data of a photographing scene in which a subject is photographed with a camera, as well as, capturing camera information of the photographing scene acquired or input in the camera when the subject is photographed; or optionally obtaining related information related to the photographing scene based on at least one of the captured digital image data of the photographing scene and the captured camera information thereof; assuming the photographing scene by at least one of the camera information and the related information or by a combination with the digital image data and the at least one of the camera information and the related information; and subjecting preset image processing to the digital image data depending on the assumed photographing scene.

In order to attain first object described above, it is preferable that, in a first aspect of the image processing method of the present invention, the camera information of the photographing scene includes photographing information and photographing position information captured in the camera, the related information includes supplementary information relating to the camera information, the assuming step of the photographing scene is a step of specifying the subject in the photographing scene or assuming a photographing situation when the subject is photographed from the camera information and the supplementary information, and the preset image processing is image processing depending on the specified subject or the assumed situation.

Preferably, the supplementary information includes map information.

Preferably, the photographing information includes information on photographing date and time and the supplementary information includes weather information, and wherein a situation of the photographing scene is assumed by specifying weather in a photographing location at the time of photographing from the information on photographing date and time and the photographing position information in the camera information, as well as the weather information in the supplementary information.

Preferably, the photographing information includes information on photographing date and time and the supplementary information includes event information, and a situation of the photographing scene is assumed by specifying an event in a photographing location at the time of photographing from the information on photographing date and time and the photographing position information in the camera information, as well as the event information in the supplementary information.

Preferably, at least one of gradation control of density or color, geometrical distortion correction, and emphasizing or smoothing processing is executed in an entire region of a photographed image of one frame, or a region limited to the specified subject as the preset image processing.

In order to attain the second object described above, it is another preferable that, in a second aspect of the image processing method of the present invention, the related information includes map information and/or accumulated images, the camera information of the photographing scene includes at least one of photographing position information or photographing direction information and photographing magnification information captured in the camera, the assuming step of the photographing scene comprises the steps of: preparing a simulation image of the photographing scene using the camera information and the map information or the accumulated images; comparing the prepared simulation image with a photographed image of the photographing scene; and detecting a defective region or an unnecessary region in the photographed image of the photographing scene, and the preset image processing step comprises a step of subjecting restoration processing to the defective region or the unnecessary region in the photographing image.

Preferably, the detecting step of the defective region or the unnecessary region is for determining a line or a point existing in the photographed image that does not match the simulation image as a result of comparing the simulation image with the photographed image; and the restoring processing step is for restoring and erasing the determined line or point using corresponding pixels in the simulation image, or corresponding pixels or marginal pixels in the photographed image.

Preferably, the comparing step for comparing the simulation image with the photographed image is for comparing distribution of density and color or distribution of sharpness in a preset region within a picture of the photographing scene, between the simulation image and the photographed image; the detecting step of the defective region or the unnecessary region is for detecting distortion in the distribution of density or color or the distribution of sharpness in the preset region; and the restoring processing step is for correcting unevenness or unsharpness with respect to the preset region.

Preferably, the comparing step for comparing the simulation image and the photographed image is for dividing an entirety of a picture of the photographing scene into a plurality of sub-regions, and comparing distribution of density or color or distribution of sharpness for each of the plurality of sub-regions, between the simulation image and the photographed image; the detecting step of the defective region or the unnecessary region is for detecting a sub-region in which the distribution of density and color or the distribution of sharpness has distortion out of the plurality or sub-regions; and the restoring processing step is for correcting unevenness or unsharpness with respect to the region in which the distribution has distortion.

Preferably, the detecting step of the defective region or the unnecessary region is for deriving a region of a specific construction in the simulation image; the comparing step of the simulation image with the photographed image is for setting a region that is the same as the region of the specific construction derived in the simulation image in the photographed image; and the restoring processing step is for performing processing for removing the specific construction from the same region set in the photographed image.

In order to attain the third object described above, it is further preferable that, in a third aspect of the image processing method of the present invention, the camera information of the photographing scene includes message information relating to the photographing scene, acquired or input in the camera and assigned to the digital image data; the assuming step of the photographing scene is a step of assuming the photographing scene from contents of the message information; and the preset image processing step is a step of subjecting image processing by means of image processing conditions set in accordance with the assumed photographing scene.

Preferably, the message information is at least one of audio information and text information.

Preferably, the photographing scene is assumed by combining either of photographing information at the time of photographing, an image characteristics amount or principal subject information with the message information.

In the image processing method of respective aspects, the processed image data obtained by subjecting the preset image processing to the digital image data is preferably converted to at least one of print output image data outputted to a printer producing a print, media output image data utilized in recording to and reproducing from a image data recording medium and communication image data utilized in communicating via a communication device, and is output.

Preferably, subject-related information is derived from a database by means of the subject assumed from the camera information and the related information and utilized as at least one of additional information for compositing at the time of producing the print, additional information for reproducing at the time of reproducing on the image data recording medium and additional information for reproducing at the time of reproducing after receiving via the communication device.

In order to the first, second and third objects described above, the present invention provides an image processing apparatus, comprising: an image data capturing device which captures digital image data of a photographed image in a camera capable of obtaining the photographed image of a photographing scene in which a subject is photographed, as well as, acquiring or inputting camera information of the photographing scene when the subject is photographed; a camera information capturing device which captures the camera information of the photographing scene acquired and input in the camera; an assuming device which assumes the photographing scene by the camera information or by a combination with the digital image data and the camera information; and an image processing device which subjects preset image processing to the digital image data depending on the assumed photographing scene.

It is still another preferable that the image processing apparatus further comprises: a database which stores related information related to the digital image data of the photographing scene and the camera information; and an obtaining device which obtains the related information related to the photographing scene and acquired or input in the camera, or stored in the database, based on the digital image data of the photographing scene and the captured camera information thereof; wherein the assuming device assumes the photographing scene by the related information of the photographing scene or by a combination with the related information and at least one of the camera information and the digital image data.

In order to attain the first object described above, it is preferable that, in a first aspect of the image processing apparatus of the present invention, the camera information capturing device captures photographing information and photographing position information captured in the camera as the camera information of the photographing scene, the obtaining device which obtains supplementary information relating to the camera information as the related information, the assuming device specifies the subject in the photographing scene or assumes a photographing situation when the subject is photographed from the camera information and the supplementary information, and the image processing device subjects image processing depending on the specified subject or the assumed situation as the preset image processing.

Preferably, the supplementary information includes map information.

Preferably, the photographing information includes information on photographing date and time and the supplementary information includes weather information, and the assuming device assumes a situation of the photographing scene by specifying weather in a photographing location at the time of photographing from the information on photographing date and time and the photographing position information in the camera information, as well as the weather information in the supplementary information.

Preferably, the photographing information includes information on photographing date and time and the supplementary information includes event information, and the assuming device assumes a situation of the photographing scene by specifying an event in a photographing location at the time of photographing from the information on photographing date and time and the photographing position information in the camera in information, as well as the event information in the supplementary information.

Preferably, the image processing device executes at least one of gradation control of density or color, geometrical distortion correction, and emphasizing or smoothing processing in an entire region of a photographed image of one frame, or a region limited to the specified subject as the preset image processing.

In order to attain the second object described above, it is another preferable that, in a second aspect of the image processing apparatus of the present invention, the obtaining device obtains map information and or accumulated images related to the camera information as the related information, the camera information capturing device captures at least one of photographing position information or photographing direction information and photographing magnification information captured in the camera as the camera information of the photographing scene, the assuming device comprises: a preparing device which prepares a simulation image of the photographing scene using the camera information and the map information or the accumulated mages; a comparing device which compares the simulation image prepared by the preparing device with a photographed image of the photographing scene; and a detecting device which detects a defective region or an unnecessary region in the photographed image of the photographing scene, and the image processing device comprises a restoration processing device which subjects restoration processing to the defective region or the unnecessary region in the photographing image as the preset image processing.

Preferably the detecting device determines a line or a point existing in the photographed image that does not match the simulation image as a result of comparing the simulation image with the photographed image; and the restoring processing device restores and erases the determined line or point using corresponding pixels in the simulation image, or corresponding pixels or marginal pixels in the photographed image.

Preferably, the comparing device compares distribution of density and color or distribution of sharpness in a preset region within a picture of the photographing scene, between the simulation image and the photographed image; the detecting device detects distortion in the distribution of density or color or the distribution of sharpness in the preset region; and the restoring processing device corrects unevenness or unsharpness with respect to the preset region.

Preferably, the comparing device divides an entirety of a picture of the photographing scene into a plurality of sub-regions, and compares distribution of density or color or distribution of sharpness for each of the plurality of sub-regions, between the simulation image and the photographed image; the detecting device detects a sub-region in which the distribution of density and color or the distribution of sharpness has distortion out of the plurality of sub-regions; and the restoring processing device corrects unevenness or unsharpness with respect to the region in which the distribution has distortion.

Preferably, the detecting device derives a region of a specific construction in the simulation image; the device sets a region that is the same as the region of the specific construction derived in the simulation image in the photographed image; and the restoring processing device performs processing for removing the specific construction from the same region set in the photographed image.

In order to attain the third object described above, it is further preferable that, in a third aspect of the image processing apparatus of the present invention, the camera information capturing device captures message information relating to the photographing scene, acquired or input in the camera and assigned to the digital image data, the assuming device assumes the photographing scene from contents of the message information; and the image processing device subjects image processing by means of image processing conditions set in accordance with the assumed photographing scene.

Preferably, the message information is at least one of audio information and text information.

Preferably, the assuming device assumes the photographing scene by combining either of photographing information at the time of photographing, an image characteristics amount or principal subject information with the message information.

It is still another preferable that the image processing apparatus further comprises; a converting device which converts the processed image data obtained by subjecting the preset image processing to the digital image data to at least one of print output image data outputted to a printer producing a print, media output image data utilized in recording to and reproducing from a image data recording medium and communication image data utilized in communicating via a communication device, and is output.

It is still further preferable that the image processing apparatus further comprises; a converting device which converts the processed image data obtained by subjecting the preset image processing to the digital image data to at least one of print output image data outputted to a printer producing a print, media output image data utilized in recording to and reproducing from a image data recording medium and communication image data utilized in communicating via a communication device, and is output.

Preferably, the obtaining device derives subject-related information from the database by means of the subject assumed from the camera information and the related information by the assuming device, the apparatus further comprising an information adding device which adds the subject-related information derived by the obtaining device, based on the converted image data by the converting device, as at least one or additional information for compositing at the time of producing the print, additional information for reproducing at the time of reproducing a on the image data recording medium and additional information for reproducing at the time of reproducing after receiving via the communication device.

BRIEF DESCRIPTION OF THE DRAWINGS

Other objects and advantages of the present invent on will become apparent during the following discussion in conjunction with the accompanying drawings, in which.

DESCRIPTION OF THE PREFERRED EMBODIMENT

When a subject is photographed, the present intention uses camera information acquired with a camera such as photographing information of the camera including GPS information and message information provided to the camera or related information of a photographing scene and further image data of the photographing scene to assume the photographing scene and performs image processing in accordance with the thus assumed photographing scene.

A method and an apparatus for image processing in accordance with a first aspect of the present invention will be described showing a preferred embodiment first. This embodiment is or assuming (specifying) subject scene by photographing information of a camera (camera information) including GPS information acquired using a camera capable of utilizing the GPS with a satellite, and controlling color and gradation according to the subject scene. However, the present invention is not limited to this embodiment.

Figure 1:
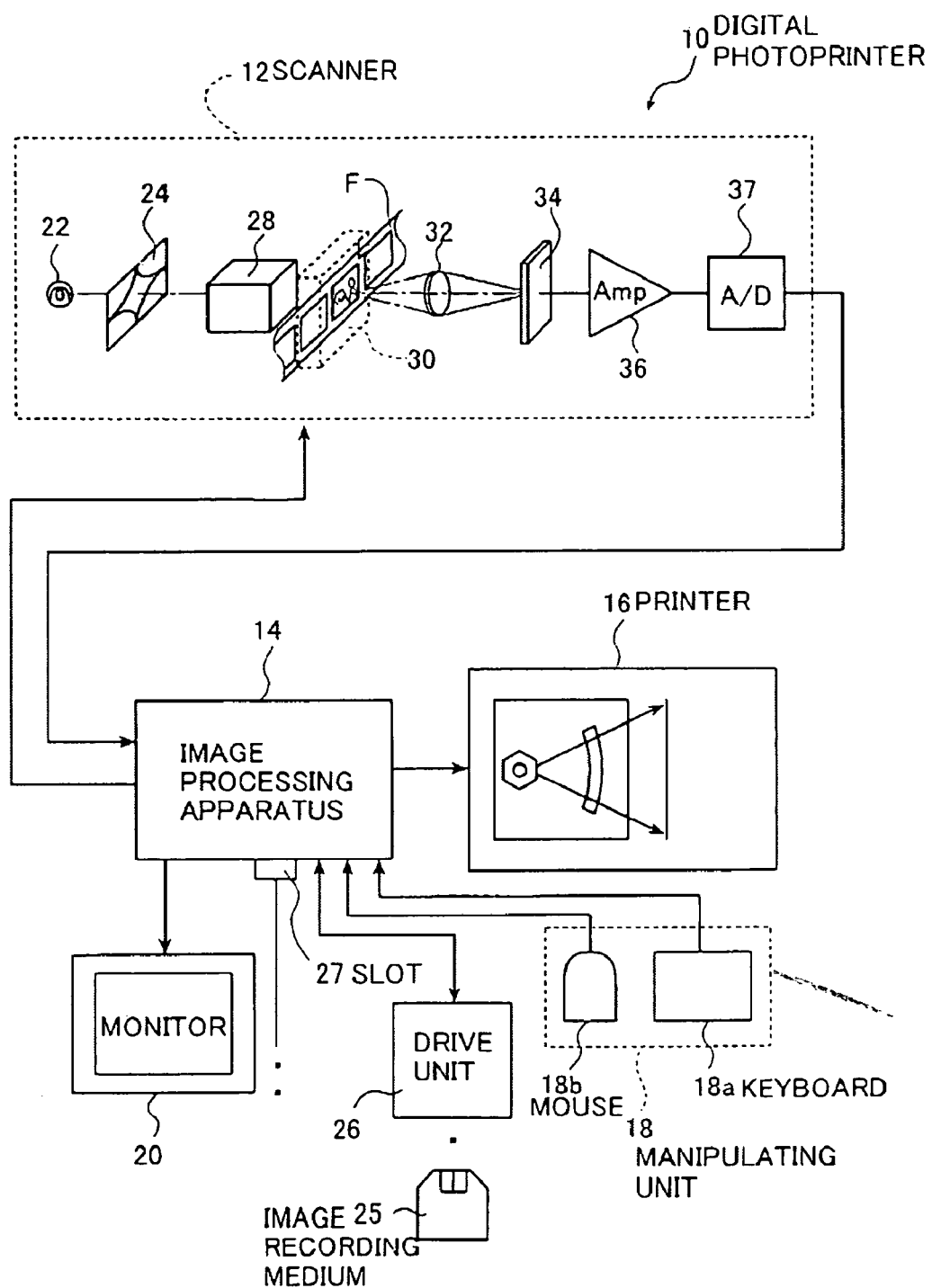
FIG. 1 is a block diagram of an example of a digital photoprinter to which an image processing apparatus of the present invention for executing an image processing method of the present invention is applied.

FIG. 1 is a block diagram of an example of a digital photoprinter to which an image processing apparatus for implementing an image processing method of the present invention is applied.

The digital photoprinter 10 shown in the figure basically comprises: a scanner 12 (image reading device) that reads the image recorded on a film F photoelectrically; an image processing apparatus 14 that performs image processing of the thus read image data (image information), as well as various data processing for performing the image processing method of the invention, and that allows for manipulation, control and the like of the digital photoprinter 10 in its entirety; and a printer 16 that exposes a light-sensitive material imagewise with optical beams modulated in accordance with the image data outputted from the image processing apparatus 14, develops the light-sensitive material and outputs it as a photographic print. Further, the outputted image data processed by the image processing method of the present invention outputted from the image processing apparatus 14 are not limited to those outputted to the printer 16 for being outputted as a photoprint, but may be those outputted for being recorded (reproduced) in various image data recording media (image recording media to be distributed by a communicating network such as Internet through a slot 27 as exemplified by transfer service via network (reproduction).

The image processing apparatus 14 is connected with a manipulating unit 18 having a keyboard 18a and a mouse 18b to enter and set various conditions, to select a specific processing step and issue a command for the step and to enter commands for color/density correction and the like, as well as an image display device (a display monitor, hereinafter referred to simply as a monitor) 20 that displays the image read with the scanner 12, various kinds of manipulative instructions, and screens on which various conditions are set and/or registered, and so forth.

The scanner 12 is a device for photoelectrically reading the color image recorded on the film F. The scanner 12 comprises a light source 22, a variable stop 24, a diffuser box 28 with which the reading light incident on the film F is made uniform in the direction of the plane of the film F, an imaging lens unit 32, a CCD sensor 34 which is a photo sensor that reads the image recorded on the film, an amplifier 36 and an A/D (analog/digital) converter 37. Further, the scanner 12 comprises a dedicated carrier 30 which can be mounted on and dismounted from the main body of the scanner 12. As the carrier 30, there are prepared various types of dedicated carriers which correspond to elongated films such as, for example, a 24-exposures film of 135 size, a film for the Advanced Photo System (APS cartridge), and the like. The carrier 30 includes transport rollers, a mask having a slit and magnetic reading and writing units. The transport rollers are disposed on the opposite sides of a preset reading position in an auxiliary scanning direction which is perpendicular to the main scanning direction. They transport the film F with its length being parallel to the auxiliary scanning direction which is perpendicular to a direction in which the line CCD sensor of the CCD sensor 34 extends (main scanning direction) while holding the film F at the preset reading position. The slit defines the light projected from the film F so that the light has a preset slit shape, is located in accordance with the reading position and extends in the main scanning direction. The carrier 30 further has a magnetic reading and writing unit.

Being held by the carrier 30, the film F is illuminated with the reading light while transported in the auxiliary scanning direction. Consequently, the film F is subjected to two-dimensional slit scan with the reading light passing through the slit extending in the main scanning direction, whereupon the image of each frame recorded on the film F is captured.

The CCD sensor 34 is a line sensor comprising three line CCD sensors for reading R image, G image, and B image respectively. These line sensors extends in the main scanning direction. The light projected from the film F is separated into three primary colors R, G and B and acquired photoelectrically by means of the CCD sensor.

The reading light emitted from the light source 22 is adjusted in quantity by the variable top 24, then uniformly diffused by passage through the diffuser box 28; the thus treated reading light is incident on the film F which is transported while being held at the preset reading position by the carrier 30, through which it is transmitted to produce projected light that carries the image recorded on the film F.

The light projected from the film F passes through the imaging lens unit 32 to be focused on the light-receiving plane of the CCD sensor 34 and read with the CCD sensor 34 photoelectrically; the resulting output signal is amplified with the amplifier 36, converted into digital image data with the A/D converter 37 and, thereafter, sent to the image processing apparatus 14 as an input image data.

As known well, in the film F of the Advanced Photo System (APS), magnetic recording layers are formed to the portions above and below the image recording regions of the respective frames of the film F, to which images in a photographing scene, namely photographed images are recorded, on the back surface (non-emulsifier surface) of the film F. Recorded to the magnetic recording layers are a cartridge ID, film type, etc., information and data such as photographing information, for example, a photographing date and time such as a photographing date, photographing time and so forth, photographing position (camera position), photographing direction, photographing magnification and the like, supplementary information based on the photographing information, and particularly supplementary information related to at least a part of photographing information such as above all, supplementary information related to the subject itself or the photographing situation of the photographed image, which is defined by these photographing information, and supplementary information added when a photo print order was placed before is recorded as attached information of the photographing image.

The thus recorded information is acquired with the magnetic reading and writing units in the scanner 12 when an image of the film F is read with the scanner 12. More specifically, while the film (cartridge) of the Advanced Photo System APS is set to the carrier 30 corresponding to the film and the film F is transported in the auxiliary scanning direction and read with the CCD sensor 34, the magnetically recorded information is read with the magnetic reading and writing units. Then, various kinds of information including the photographing information is sent to the image processing apparatus 14. When required, necessary information such as the supplementary information and the like based on the photographing information is recorded to the magnetic recording layers by the magnetic reading and writing units.

Further, when the film cartridge includes an IC memory mounted thereon and if a cartridge ID, film type, and the data of photographing information such as photographing date and time, photographing position, photographing (camera) direction, photographing magnification and so forth are recorded to the thus mounted IC memory, the information can be read. In addition, when the supplementary information which was added when the photo print order was placed before is recorded, the supplementary information is also read. Furthermore, necessary information is recorded to the IC memory when necessary.

It is needless to say that the method of capturing and the method of recording photographing information and supplementary information, which is based on the photographing information, are not limited to the reading of data from and the recording of data to the magnetic recording layers of the APS film and the IC memory of the film cartridge provided with it.

It should be noted that the scanner 12 which constitutes the digital photoprinter 10 is by no means limited to a type that relies upon the slit scan capturing described above, but that it may be a CCD area sensor making use of areal exposure by which the entire surface of the image in one frame is captured at a time. In this alternative approach, R, G and B color filters are interposed between the variable top 24 and the diffuser box 28 shown in FIG. 1. In this case, the projected light which carries the image recorded to the frame of the film F may be obtained in such a manner that the light having passed through the color filters and subjected to R, G and B color adjustment is incident on one frame of the film F and passes therethrough. At the time, the color filters must be sequentially inserted to the light passage from the light source three times to separate the image to R, G and B primary colors.

When the scanner 12 reads the image through the CCD sensor, it carries out prescan for reading the image at low resolution prior to fine scan, in which the image is read to output a photographic print, in order to determine image processing conditions and the like. After the operator (or the user) confirms and adjusts the image processing conditions on the monitor 20, the fine scan is carried out to read the image at high resolution. That is, scanning is carried out twice for the prescan and the fine scan. Accordingly, when the R, G and B color filters are provided and the CCD area sensor making use of the areal exposure is used, the scanning must be carried out a total of six times. This is because that each of the prescan and the fine scan must be carried out three times through the R, G and B color filters. Whereas, when the line CCD sensor is used, the scanning is carried out only twice, which is advantageous to prompt processing.

In the above description, all the images recorded on the film F are captured at a time in the prescan to thereby determine the image processing conditions and subsequently the fine scan is carried out. However, the prescan and the fine scan may be successively carried out to each frame of the film F.

The present invention can use various kinds of image data supply sources, in addition to the scanner 12 which photoelectrically reads an image recorded to a film such as a negative film and reversal film. Exemplified as the image data supply source are an image reading device for reading an image of a reflecting document; communication means such as computer communication and so forth (including communication means operated through modem); a photographing device such as a digital camera, digital video camera and the like and memory contained therein; an image recording medium for digital camera such as a PC card, smart media and the like; a general-purpose image recording medium such as an FD (floppy disc), an MO (magneto-optic recording medium) and the like. These image data supply sources can be connected to the image processing apparatus 14 directly or through a drive unit thereof. The image processing apparatus 14 can receive digital image data and the photographing information and supplementary information of the digital image data from the image data supply source. These image data supply sources also function as a unit that receives image data processed by the image processing method of the present invention.

In particular, in the photoprinter 10 illustrated in FIG. 1, a drive unit 26 is connected to the image processing apparatus 14 in order to read and acquire image data from an image recording medium 25 for a digital camera to which digital image data photographed with the digital camera or the like is recorded and from a general-purpose image recording medium 25 and also to record the processed image data in the image recording medium 25 for outputting. Exemplified as the former recording medium 25 are a card memory such as a PCMCIA (PC card), an ATA card, a compact flash card, etc. Further, exemplified as the latter general-purpose recording medium 25 are an FD (floppy disc), a CD-R (recordable compact disc), an MO (magneto optical disc), a DVD (digital versatile disc), Zip, etc. Further, the image processing apparatus 14 is provided with a slot 27 or the like so that it acquires digital image data and the photographing information and additional information that are supplementary information of the data and distributes the processed image data by being connected to various kinds of image data supply sources such as a scanner, an image processing device and the like of a (personal) computer, a digital camera and another digital photo printer directly through a cable (for example, RS232C) or through a communication network such as the Internet.

In the illustrated example, input signals (digital image data and supplementary information (photographing information and additional information)) are supplied to the image processing apparatus 14 through the various kinds of the image data supply sources such as the scanner 12, the drive unit 26 and so forth. However, in the following description, a case in which digital image data is supplied to the image processing apparatus 14 mainly from the scanner 12 will be described as a representative example.

Figure 2:
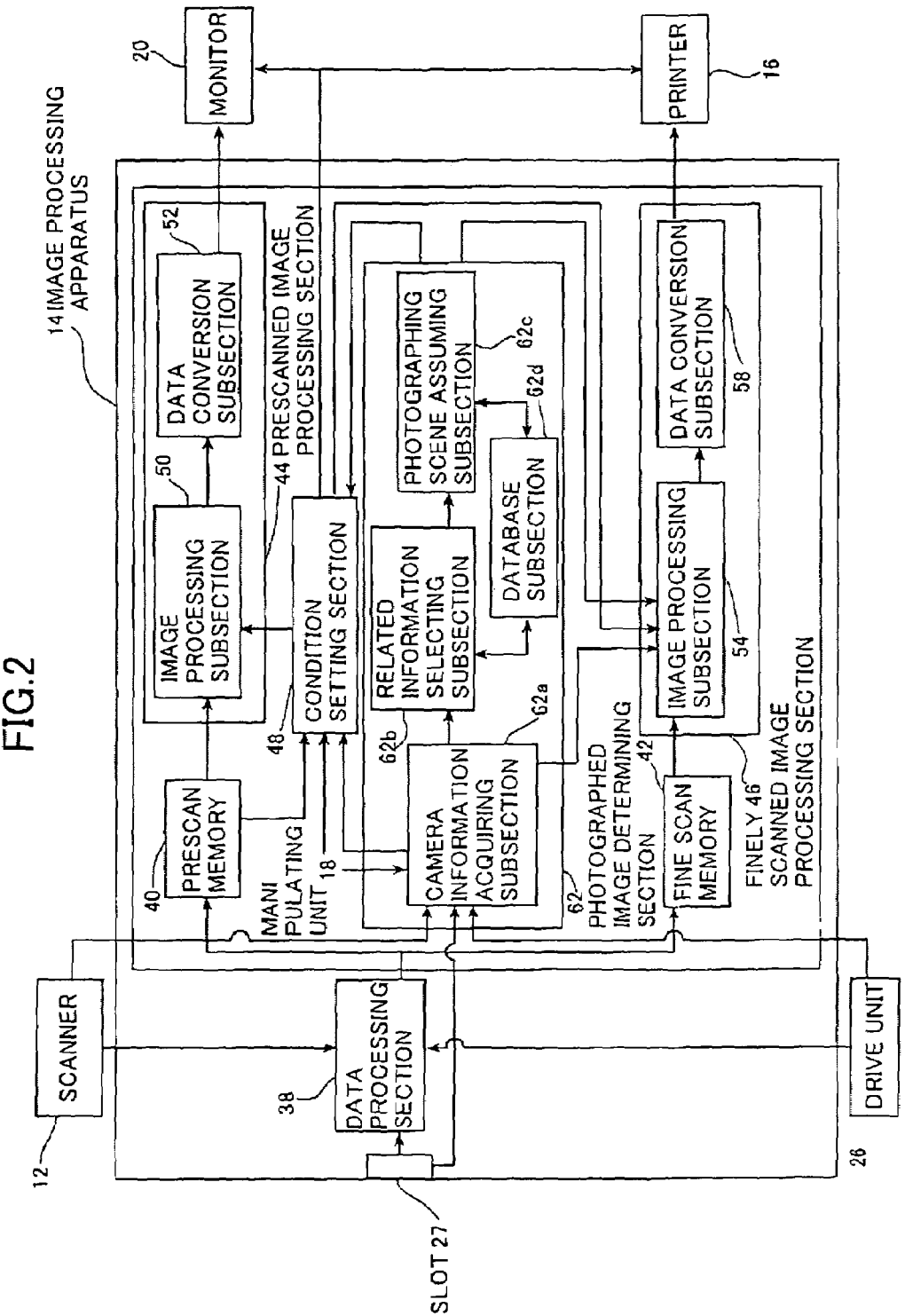
FIG. 2 is a block diagram illustrating a configuration of an embodiment of an image processing apparatus of the present invention used in the digital photoprinter of FIG. 1.

The image processing apparatus 14 subjects the image data, which is captured with the scanner 12 and sent to it as digital data, to preset image processing and outputs the thus processed image data to the printer 16 or to the monitor 20. FIG. 2 shows a block diagram of the image processing apparatus 14.

As illustrated in the figure, the image processing apparatus 14 comprises a data processing section 38, a prescan memory 40, a fine scan memory 42, a prescanned image processing section 44, a finely scanned image processing section 46, a condition setting section 46 and a photographed image determining section 62.

In the data processing section 38, the digital image data (input image data signals) associated with R, G and B, which has been delivered from the scanner 12, is subjected to Log conversion, DC offset correction, darkness correction, shading correction and so forth, and the processed prescan (image) data is stored in the prescan memory 40 and the processed fine scan (image) data is stored in the fine scan memory 42, respectively. It should be noted that A/D conversion may not be carried out by the scanner 12 but may be executed in the data processing section 38.

The prescan memory 40 and the fine scan memory 42 store the digital image data processed in the data processing section 38. The digital image data are sent to the prescanned image processing section 44 or to the finely scanned image processing section 46 as necessary so that they are subjected to the image processing and output.

The prescanned image processing section 44 comprises an image processing subsection 50 and an image data conversion subsection 52. The image processing subsection 50 is a section where correction processing is carried out such as the correction of distortion aberration and transverse chromatic aberration, which result from the aberration characteristics of a photographing lens and the correction aberration due to the drop of marginal light and an unsharp image, in addition to the execution of image processing as prior art such as color balance adjustment, contrast correction, and brightness correction, and further sharpness processing, dodging processing, and the like.

The image data conversion subsection 52 converts the image data, which was subjected to image processing in the image processing subsection 50, using a 3-D (three dimensional)-LUT and the like so that the image data can be processed to be displayed on the monitor 20.

The finely scanned image processing section 46 comprises an image processing subsection 54 and an image data conversion subsection 58.

The image processing subsection 54 subjects finely scanned image data to color balance adjustment, contrast correction (gradation processing), brightness correction and the like through a not shown LUT (look-up table) under the image processing conditions determined based on the prescanned image data. Further, the image processing subsection 54 subjects the finely scanned image data to saturation correction through a not shown MTX operation. These operations are carried out by means of known methods. In addition, sharpness processing, dodging processing and the like are carried out as well as the correction of distortion aberration and transverse chromatic aberration, which result from the aberration characteristics of the photographing lens, and electronic scaling for magnifying and reducing an image according to the output size of a photographic print are carried out in accordance with an operator's instruction and image data and the like.

In addition, the image processing subsection 54 may carry out image processing corresponding to a subject specified in a photographing scene or an assumed photographing situation in the first aspect of the present invention, and may carry out correction processing of an unnecessary area or a defective area detected in a photographing scene in a second aspect according to the present invention. Preferably, such image processing is at least one of density or color gradation control, geometrical distortion correction, and emphasizing or smoothing processing of the entire screen of a photographed scene image of one frame, or limited to a specified subject region. Moreover, preferably, correction processing is at least one of processing such as correction of a dust, a tarnish or a noise in an image of a photographing scene, correction of density unevenness, unsharpness or the like, and removal of an unnecessary object. Further, these image processing and correction processing may be carried out in the image processing subsection 50 of the prescanned image processing section 44 in addition to the image processing subsection 54.

The image data conversion subsection 58 converts the image data, which was subjected to the image processing in the image processing subsection 54, using the 3-D (three dimensional)-LUT or the like so that the image data can be processed to image data to be outputted to the printer 16.

The processed image data as obtained by the image processing methods according to the first to third aspects of the present invention are outputted to the printer 16 for print output, but this is not the sole case of the present invention. The processed image data may be converted in the image data conversion subsection 58 (by for example format conversion adapted for medium output) into image data for recording on the image recording medium 25, which is then outputted to the drive unit 26. Alternatively, the processed image data may be outputted to the slot 27 after having been converted (by for example format conversion adapted for network output) into image data for distributing via a communication network such as Internet or a communication device. Also in the present invention, the processed image data can be utilized not only for print output but also for recording on various image recording media and reproduction therefrom, and various distribution (transfer) services through network and subsequent reproduction.

When compositing a print or reproducing from various image recording media or after transfer through network, for example reproducing and displaying on a monitor or the like, subject-related information derived from a database subsection 62*d* to be described below and other related formation may be used as additional information.

The condition setting section 48 is used to read out the prescanned image data from the prescan memory 40 and to determine the image processing conditions.

Specifically, density histograms are created and characteristic quantities of an image such as its average density, LATD (large area transmission density), highlight (minimum density) and shadow (maximum density) are calculated from the prescanned image data; in addition, in response to an operator's command that is optionally issued, various operations are performed such as the above-described creation of the table (LUT) for gray balance adjustment and the like and the generation of the matrix operation for saturation correction, whereby the image processing conditions are determined. The thus determined image processing conditions are further adjusted through the manipulating unit 18 having the keyboard 18*a* and the mouse 18*b* and set again thereby.

Further, in the first and the second aspects of the present invention, the condition setting section 48 can reset image processing conditions or can set correction conditions according to the specified subject, the assumed photographing situation, and information on the defective area such as density unevenness, unsharpness or the like.

In addition, when supplementary information relating to at least a part of photographing information such as photographing date and time data, the photographing location and the like is to be selected, the keyboard 18*a* and the mouse 18*b* are used to designate the items of the supplementary information in response to the user's wish.

Further, the monitor 20 is used for the operator to confirm and verify whether the image processing of the prescanned image data was properly carried out or not, and is connected to the image processing apparatus 14 through the image data conversion subsection 52.

FIG. 2 mainly shows the sections which relate to image processing. Disposed in the image processing apparatus 14 in addition to the above sections are a CPU for controlling and managing the digital photoprinter 10 including the image processing apparatus 14 in its entirety, a memory for storing information necessary to the operation of the digital photoprinter 10 or the like, means for determining the step value of the variable stop 24 and the accumulating time of the CCD sensor 34 in the fine scan, and the like.

The photographed image determining section 62 comprises a camera information acquiring subsection 62*a*, a related information selecting subsection 62*b*, a photographing scene assuming subsection 62*c* and a database subsection 62*d*. The camera information acquiring subsection 62*a* acquires photographing information such as a photographing date and time as well as camera information such as photographing position, photographing direction and photographing magnification. The related information select in a subsection 62*b* selects supplementary information and other related information required for determining a photographing scene based on the camera information. The photographing scene assuming subsection 62*c* specifies a subject within an image of the photographing scene and assumes a situation at the time of photographing based on the camera information acquired in the camera information acquiring subsection 62*a* and the related information selected in the related information selecting subsection 62*b*, prepares a simulation image based on the specified subject and the assumed situation, compares the simulation image with the photographed image, detects an unnecessary area and a defective area, and so forth. The database subsection 62*d* stores various kinds of information, which are referred to as related information by the photographing scene assuming subsection 62*c*, as exemplified by a database of an encyclopedia and the like storing data to be selected by the related information selecting subsection 62*b*; a map database to be used for specifying a subject within an image in a photographing scene; a three-dimensional database for preparing a simulation image of a photographing scene; a photographed image (accumulated image) database in which photographed images such as well-known mountains, sightseeing places of interest, famous photographing spots and the like that will be a main subject; a weather database that records weather of various places; and an event database that records event information in various places.

Further, the related information selecting subsection 62*b* is not limited to a case in which supplementary information or other related information is selected from the database subsection 62*d*, but may select related information acquired from outside when necessary. The subject specified and the photographing situation assumed by the photographing scene assuming subsection 62*c*, and the information on the defective area having density unevenness, unsharpness or the like are sent to the condition setting section 48 for resetting image processing conditions or setting correction conditions. Naturally, such resetting of image processing conditions or the setting of correction conditions may be carried out in the photographing scene assuming subsection 62*c*. In this case, the reset image processing conditions and the set correction conditions can be directly sent to the image processing subsection 54 together with information on unnecessary area and defective area having a dust, a tarnish, a noise, an unnecessary object or the like.

In addition, the database subsection 62*d* is not limited to a one contained in the photographed image determining section 62 of the image processing apparatus 14 but may be a one to be connected to the image processing apparatus 14 as an external storage device. The number of the database subsection 62*d* is not limited to one, but may be comprised of two or more storage devices. Moreover, the database subsection 62*d* is not limited to a one provided in the photoprinter 10, but may be a database that can be connected to or can be retrieved through communicating means such as the Internet.

The digital photoprinter to which the image processing apparatus of the present invention for implementing the image processing method of the present invention is applied is basically comprised as described above. Operations of the digital photoprinter, and the image processing method and apparatus according to the first aspect of the present invention will be hereinafter described with reference to FIGS. 1 through 3.

First, a first embodiment of the first aspect of the present invention will be described that is for determining whether a photographing location is indoors or outdoors, is distinguished with camera information such as GPS information and controlling gradation according to the distinction.

Figure 3:
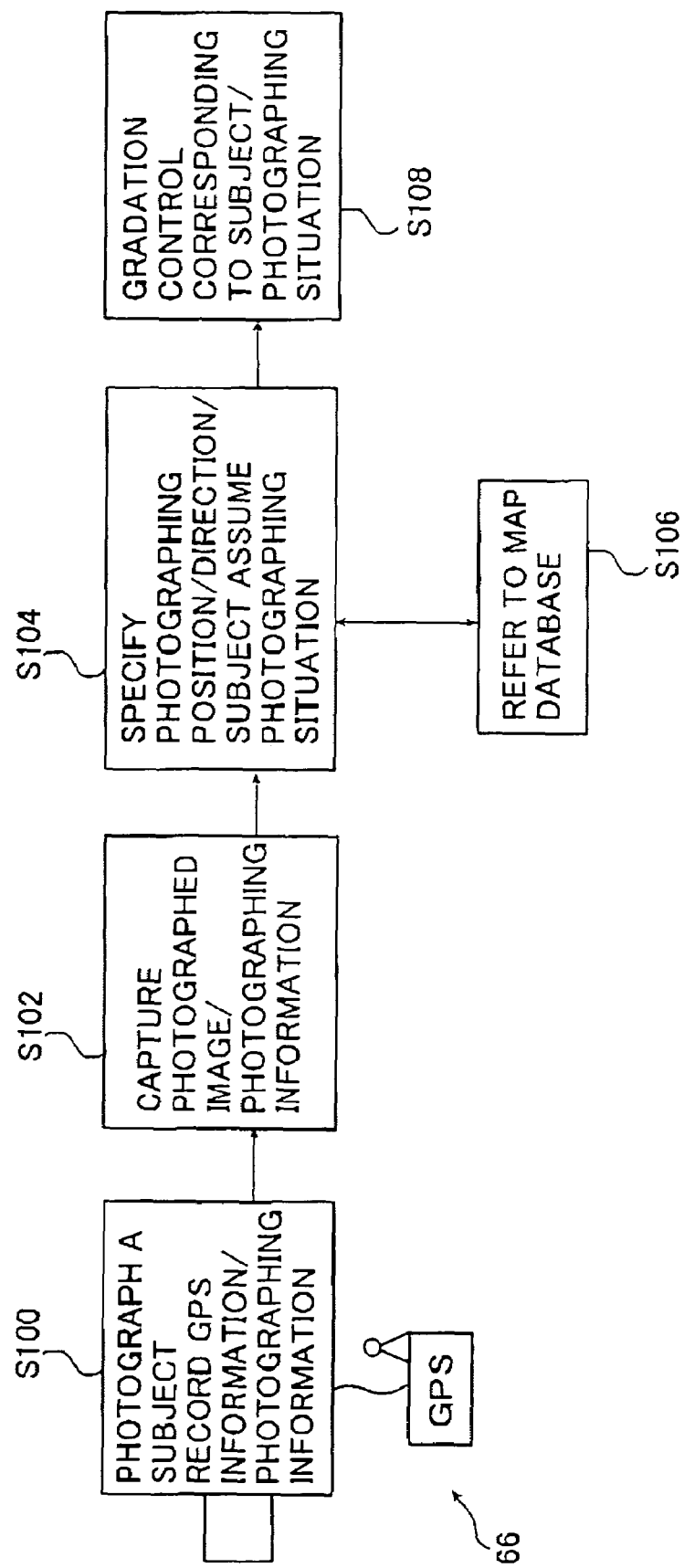
FIG. 3 is a flow chart illustrating an example of a flow from acquisition of image information to control of gradation in accordance with photographing scene in the image processing method of the present invention that is implemented in the image processing apparatus shown in FIG. 2.

FIG. 3 is a flow chart illustrating an example of a low from acquisition of image information to control of gradation according to the photographing scene in the image processing method of the first aspect of the present invention that is implemented by the image processing apparatus 14 according to the first aspect of the present invention as shown in FIG. 1. A subject is photographed, and GPS information and camera information such as various kinds of photographing information are acquired and recorded by a camera 66 that can make use of the GPS information (step S100). For example, in a case of an APS (Advanced Photo System) camera, camera information such as GPS information is recorded in magnetic recording layers that are formed in the upper and the lower regions of image recording area of each frame of a film F for the APS. Moreover, if an azimuth indicator for direction detector is added, camera information such as photographing magnification at the time of photographing can be recorded in addition to photographed latitude, longitude and altitude as well as a photographing azimuth angle with respect to a horizontal plane and a vertical plane. The recorded camera information is read with a magnetic reading and writing apparatus provided in the carrier 30 of the scanner 12, and sent to the photographed image determining section 62 from the scanner 12 through a route different from a route of image data. In this way, camera information including photographing information and the like that are obtained as associated with a photographed image as supplementary information is acquired by the camera information acquiring subsection 62a (step S102).

First of all, the related information selecting subsection 62b of the photographed image determining section 62 selects map database in the database subsection 62d from camera information such as photographing position, photographing direction or the like that was acquired in the camera information acquiring subsection 62a. The photographing scene assuming subsection 62c specifies a photographing point and a subject of the photographed image with reference to the selected map database (steps S104 and S106). The photographing scene assuming subsection 62c specifies the subject and the photographing point in the following manner.

If, for example, the photographed subject is a mountain, the name and the location of the mountain are specified referring to the map database based on the acquired photographing position and direction. A photographing position, that is, longitude, latitude and altitude can be obtained by making use of the GPS that can find a position accurately based on signals from a plurality of satellites. The positioning accuracy concerning the position of the longitude, latitude and altitude has no practical problem with 100 m or less, and an azimuth angle can be accurately measured using an azimuth indicator for direction detector. Therefore, a photographed subject and a photographing location can be specified as objects on the map database by comparing an object accommodated in a preset angle of view on a map defined relying on photographing magnification data and the photographed subject. Further, the photographing location may include not only a position of a subject within the photographed image that is displayed in the screen, that is, a location (position) where the subject was photographed, but also a location for photographing the subject such as a position of a photographer or a camera, that is, a photographing position which may also be included. This is because, not only the subject within the photographed image but also information concerning the photographing position itself can be added to the photographed image as supplementary information in this way.

Moreover, in a case in which even more accuracy is required, or in a case in which accuracy of photographing position, photographing direction and further photographing magnification is insufficient due to some reason, photographing position, photographing direction and photographing magnification can be found with high accuracy and a subject and a photographing location can be specified in detail with reference to the map database. That is, a three-dimensional computer graphics image by the map database is prepared with a well-known computer graphics (hereinafter referred to as the CG) preparing method based on photographing information; then pattern matching between the prepared CG image and an actual photographed image, for example, pattern matching between an edge line of a mountain in a CG image prepared from the map database and an edge line of a mountain on the photographed image is performed based on the acquired photographing position, photographing direction and photographing magnification data while shifting pixels of the CG image two-dimensionally; and a position, direction and photographing magnification in which both patterns matches most are calculated. Photographing position, photographing direction and photographing magnification can be found with high accuracy in this manner. As a result, the subject mountain and the location of the mountain can be specified. Further, the edge line of the mountain on the photographed image is prepared by extracting an edge based on the difference of color density of pixels.

As described above, the position (location) of the photographed mountain, names of respective photographed mountains, and the like can be specified in detail from the map database by finding photographing position, photographing direct ion and photographing magnification with high accuracy. In addition, in a case of a city area, names of respective buildings (constructions) can be specified.

Photographing position is specified in this way, and, if the position is in an environment with a lot of nature such as mountains, for example, in a forest area, it is highly likely that photographing was performed outdoors, and if the position is in a city area with crowded building such as houses, it is highly likely that photographing was performed indoors. Therefore, the photographing scene assuming subsection 62c distinguishes whether the photographing location is outdoors or indoors. Then, the image processing subsection 54 controls gradation corresponding to the specified subject (step S108).

In a case in which the photographing location is indoors, there is a possibility that so-called color failure occurs in that, for example, if illumination is a fluorescent lamp, a reproduction print gets greeny (G tint), and if illumination is a tungsten lamp, are production print gets reddish (R tint).

Thus, if it is highly likely that a photographing location is indoors, it is necessary to carry out color failure countermeasures for shifting color tint of the entire screen to gray.

On the other hand, if it is highly likely that a photographing location is outdoors, distribution of colors in a subject area is assumed, and color tint of a photographing scene is adjusted using the information of the map database. That is, in a case of an area with plenty of greens such as a forest area, the color failure countermeasures for indoors are not carried out. Conventionally, whether the photographing scene is a different kind light source scene or not is assumed by the balance of color tint of the entire screen or the like in such a case. Therefore, if the color green is relatively more than other colors in the entire screen as in a forest scene, in some cases, a photographing scene is inadvertently determined as a different kind light source scene and the natural green could not be reproduced.

However, in the above-mentioned embodiment, since the color failure countermeasures for indoors are not carried out outdoors, the color green can be reproduced as it naturally is.

A second embodiment of the first aspect of the present invention in which a photographing scene is assumed from data of a season or a date and time, and so forth when photographing was performed, and color tint of an image reproduction print is adjusted will now be described.

These embodiments are for determining a photographing season and a photographing time of a day from photographing information because color tint is different for a photographing season or a photographing time of a day even for an identical subject, and for adjusting color tint according to the determined season and time of a day.

For example, even if Mount Fuji itself is identical, it has different color tints when the photographing season is different such as summer and winter. This is the same for a photographing scene of the sea. In addition, even in a case in which a subject and a season is the same, color tint varies in the morning, the daytime and the evening when photographing is performed.

Thus, a photographing scene is assumed by combining photographing position information and photographing data and time information, and combined color tint is adjusted.

In addition, if a photographing scene is determined to be a nightscape from distance measurement data of a background area and density distribution (such as, a background part has high density in a positive image) of a photographing scene in addition to the photographing time information, contrast is emphasized. In this way, a failure in that a black part is conventionally thin and flat can be resolved, and a reproduced image with a clear black part of the nightscape can be realized. At this point, if there is distance measurement data of the background area, accuracy will increase. However, the data is not necessarily essential.

In addition, if a subject is relatively famous, an image may be prepared referring to an actual photographed image which is recorded in the database subsection 62d in advance. For example, if a subject is the Tokyo Tower, color in that the Tokyo Tower usually has is recorded, and when an image is a photographed Tokyo Tower, the balance of colors can be changed with reference to the recorded color tint.

Moreover, color tint of a reproduction print may be adjusted with the weather simulation by reading out weather information in a particular time of a day of the photographing date from the database subsection 62d. In addition, the weather information may be obtained through the Internet, for example, in a lab and the like.

That is, color tint is changed according to the difference of fine weather, cloudy weather and rainy weather. For example, in a case of cloudy weather or rainy weather, a sense of clearness is supplemented by intentionally increasing saturation. Or, conversely, color tint may be adjusted such that a print having a gloomy impression is intentionally obtained.

A third embodiment of the first aspect of the present invention in which a photographing scene is assumed by combining event information with position information and date and time information will now be described.

This is for assuming photographing scene using event information in a specific location, a specific date and time, and an hour and minute. The event information may be recorded in the database subsection 62d in advance as described previously, or may be obtained through the Internet. In addition, density distribution of a scene nay be added.

For example, when there is photographing information indicating that photographing was performed at a certain time, date and month along the river so and so, it is assumed that the database was retrieved to find what kind of event was held, and for example, it was determined that there was fireworks. Then, if density distribution of a frame is biased to a shadow side, the frame can be determined to have photographed fireworks. Thus, a clear print can be obtained by emphasizing contrast in the same manner as in the case of nightscape described previously. In this way, a failure in which a nightscape of the conventional art which becomes thin white can be eliminated.

In addition, when it is in winter and a photographing location is in the mountain, and if event information is that a skiing ground is open in the location, the color white is emphasized. In this way, a conventional failure that white snow becomes gloomy in a print can be resolved.

If program information of an event is available, the program information may be checked with the information on the time of photographing in the photographing information to determine a subject. Further, if the database subsection 62b has image data related to the event information, the pattern matching technique may be used to determine a subject. In addition, supplementary audio information or the like is provided as the event information, this information may be used alone or checked with other event information to determine a subject. This process enables easy determination, improvement of the accuracy and time reduction.

A fourth embodiment of the first aspect of the present invention will be now described, which processing is distinguished for a case in which a subject includes a person and a case in which a subject does not include a person, when it is known from position information that photographing was performed outdoors.

This is for preventing inadvertent extraction of a face when a photographing location is outdoor from GPS information and the like. This is attained by not performing (turning off) face extracting processing for an area that is found not to include a person, or excluding the extraction area after the face extracting processing. At this point, if an area that is found to be a background is initially excluded from an object of face extracting processing, processing time will be saved. In this way, a failure in a conventional art that a face is inadvertently extracted in a part such as the sky, the ground and the like can be resolved. In addition, by specifying a scene, an area to which face extraction is applied can be limited, and calculation time can be reduced.

Further, when a person is photographed outdoors, in some cases, shadow is conspicuous because rays irradiated on a face of a subject person is strong depending on a season and a time of a day. In such a case, processing is performed to increase brightness of the shadow part for an area that is extracted as a face, or to lower contrast.

Moreover, direction of the sunlight may be utilized for determining a shadow area of a subject (a person, a building or the nature), which is figured out from photographing position information and time information.

Lastly, each of a fifth and a sixth embodiments of the first aspect of the present invention will be described, which obtains a reproduction print of higher quality by making use of a specific subject to be extracted from photographing position information by GPS information and the map database.

The fifth embodiment is for extracting a specific building from a photographing scene, deriving a distortion correction pattern from a distorted degree of straight parts of the building, and correcting distortion for each image based on the distortion correction pattern.

The extraction of a specific building from a scene may be performed by the pattern matching with a CG image utilizing the map database as described previously. Then, a distortion degree of straight parts of the building is detected and a distortion correction pattern is derived from the distortion degree. Distortion correction is performed by preparing a correction function from the distortion correction pattern and applying the function to the entire screen. Alternatively, the correction function may be applied, for example, only to a local area such as a part of the extracted building and not to the entire screen.

If a correction function is prepared as above, it may be applied to all frames for one photographing. Further, when a correction function is prepared, data for a plurality of frames is accumulated, thus accuracy of distortion correction is increased.

It should be noted here that not only the artificial building but also horizon or sea line can be used as a subject.

The method using straight parts may be replaced by a method of comparing with a simulation image, which will be described later. In this case, characteristic points such as edge angle and vertex are extracted from a plurality of subjects to derive a geometric function for distortion correction based on a positional shift in corresponding individual characteristic points between the simulation image prepared in S208 of FIG. 5 to be described later and the photographed image.

The sixth embodiment is for making use of extraction of a specific subject in local processing of sharpness. That is, this is for specifying a subject and assuming a distance from a photographing location to the subject based on GPS information, the map database and a photographing direction of a camera, and perspective is emphasized by gradating a subject more if it is more distant from the camera. With such processing, a well-modulated and sharp reproduced image can be obtained.

In each embodiment of the image processing method that is implemented by the image processing apparatus according to the first aspect of the present invention described above, processing of an image is made efficient and quality of an image can be improved by assuming a photographing scene, specifying a subject and assuming a photographing situation, thereby distinguishing processing thereafter.

An image processing method in accordance with the second aspect of the present invention will now be described showing preferred embodiments. This embodiment for restoring an unnecessary area such as a dust, a tarnish or a noise in a photographed image, correcting a defective area such as density unevenness or unsharpness, and removing an unnecessary area such as an unnecessary object is attained by preparing a simulation image of a photographing scene using supplementary information of a photographed image such as photographing information of a camera (camera information) including GPS information that is acquired using a camera capable of utilizing the GPS using a satellite. However, the present invention is not limited to this embodiment.

Figure 4:
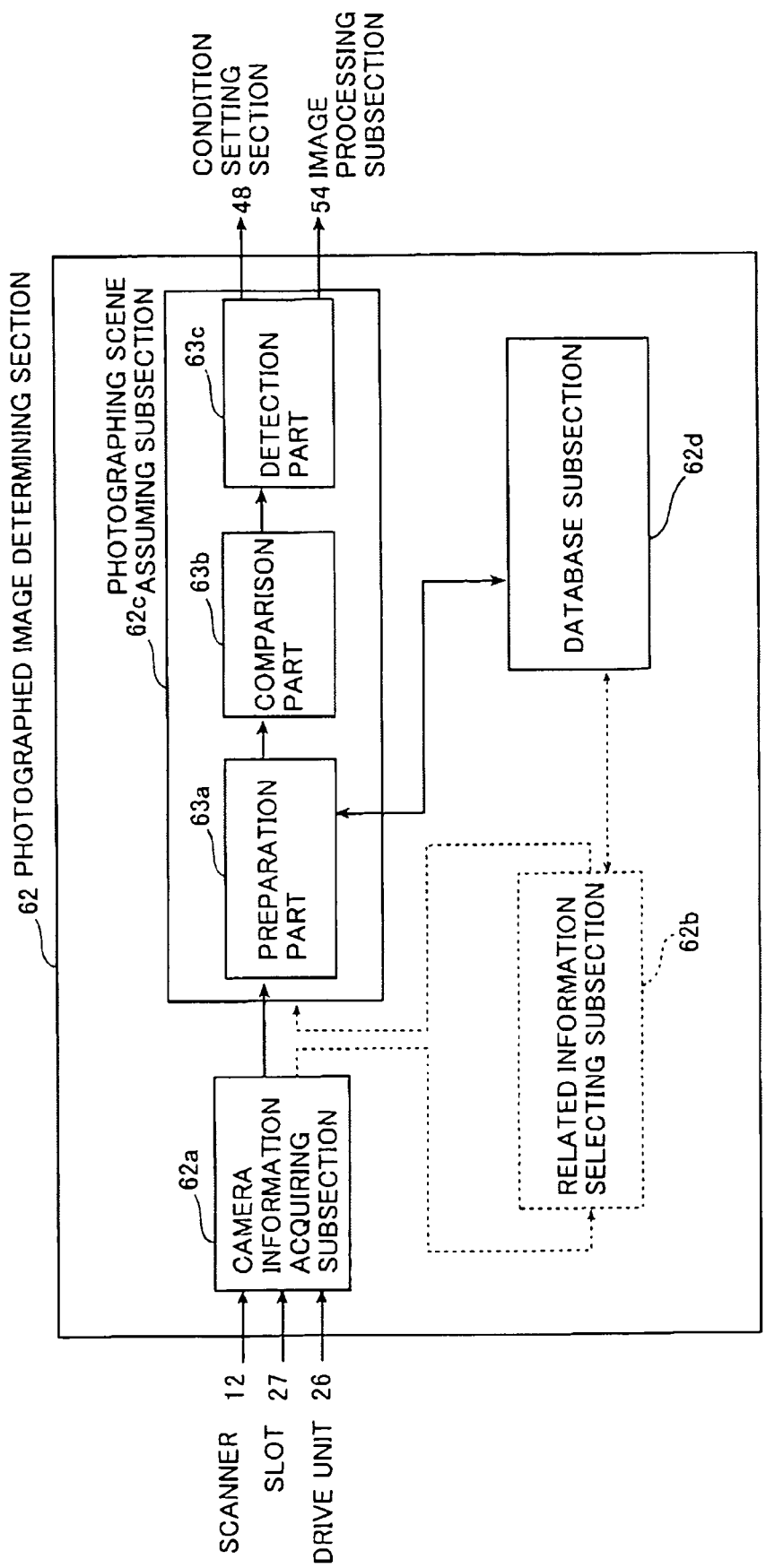
FIG. 4 is a block diagram illustrating a configuration of an example of a photographing scene assuming subsection of a photographed image determining section used in the image processing apparatus shown in FIG. 2.

The image processing method according to the second aspect of the present invention is implemented by the digital photoprinter shown in FIG. 1 to which the image processing apparatus according to the aspect under consideration as shown in FIGS. 2 and 4 is applied. Therefore, the image processing method and apparatus according to the second aspect of the present invention are now described with reference to FIGS. 1, 2, 4 and 5.

FIG. 4 is a block diagram illustrating a configuration of an example of the photographing scene assuming subsection 62c of the photographed image determining section 62 in the image processing apparatus 14 shown in FIG. 2.

As shown in FIG. 4, the photographing scene assuming subsection 62c comprises a preparation part 63a, a comparison part 63b and a detection part 63c. The preparation part 63a prepares a simulation image of a photographing scene by using at least one of the photographing position information, photographing direction information and photographing magnification information acquired as the camera information in the camera information acquiring subsection 62a, and the map information or the accumulating information that the related information selecting subsection 62b selected from the database subsection 62d as the related information. The comparison part 63b compares the simulation image of the photographing scene prepared in the preparation part 63a with the photographed image. The detection part 63c detects an unnecessary area or a defective area in the photographed scene present on the photographed image based on the comparison results obtained in the comparison part 63b.

The information on the unnecessary area or the defective area in the photographed scene as detected by the detection part 63c of the photographing scene assuming subsection 62c is sent to the image processing subsection 54 of the finely scanned processing section 46, where restoring processing of the unnecessary area or the defective is performed.

As the image processing method according to the aspect under consideration that is implemented by the photographed image determining section 62 including the photographing scene assuming subsection 62c having the configuration as mentioned above, we first describe a first embodiment of the second aspect of the present invention which comprises assuming a main subject with camera information including GPS information, preparing a database accumulating image of the main subject as a simulation image, matching with the simulation image, determining the presence of a dust, a tarnish or a noise and performing restoring processing.

Figure 5:
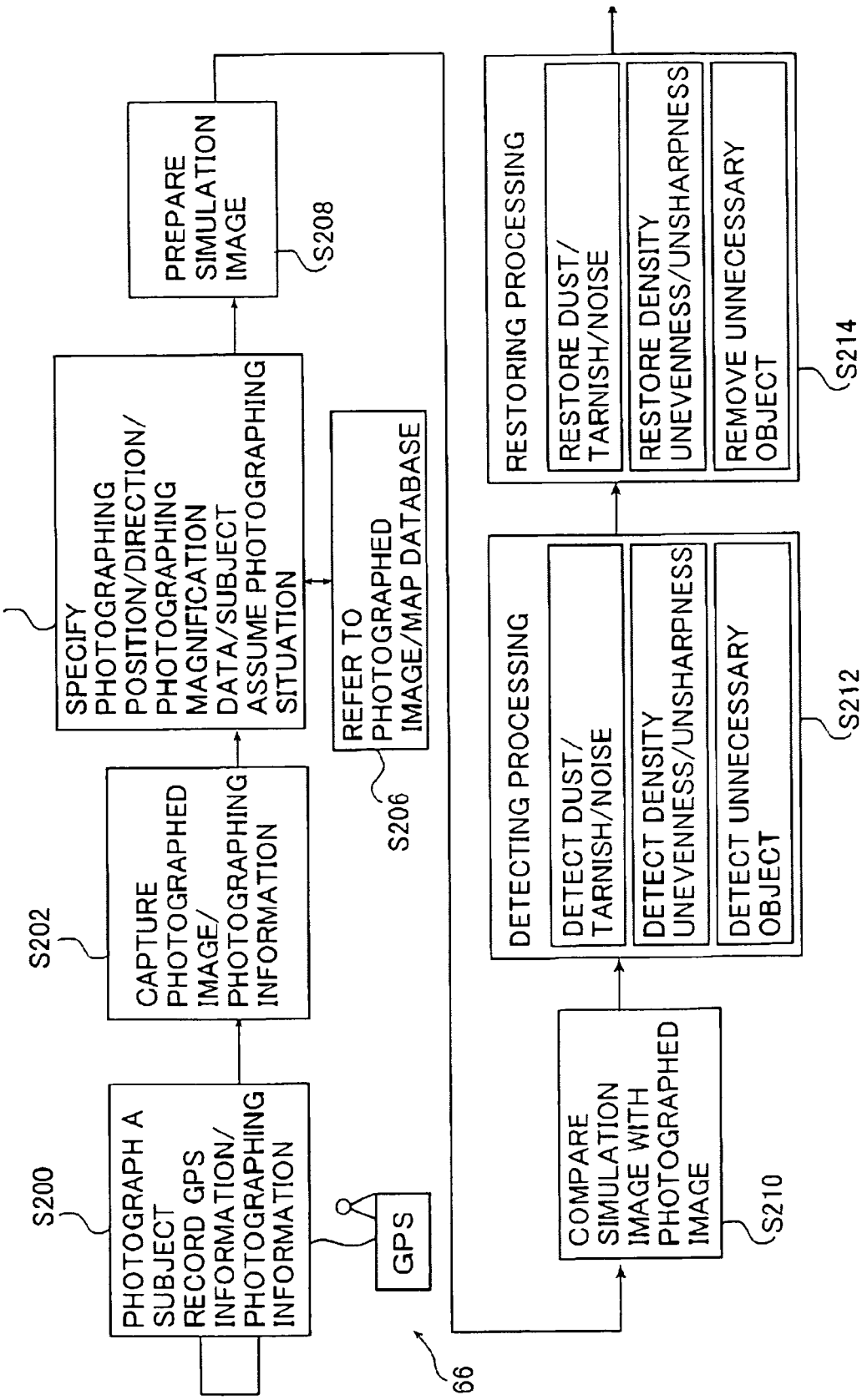
FIG. 5 is a flow chart illustrating an example of a flow from acquisition of image information to restoring processing of an unnecessary or defective area in a photographing scene in the image processing method of the present invention that is implemented in the image processing apparatus using the photographing scene assuming subsection of FIG. 4.

FIG. 5 is a flow chart illustrating an example of a flow from acquisition of image information to restoring processing of an unnecessary area or a defective area in a photographed scene in the image processing method and apparatus according to the second aspect of the present invention. In the flow chart illustrated in FIG. 5 and the flow chart illustrated in FIG. 3, photographing of a subject and recording of GPS information, other various kinds of information and the like by a camera 66 that is capable of making use of the GPS information as well as acquisition in the image processing apparatus 14 of a photographed image of a subject and photographing information such as GPS information (by the camera information acquiring subsection 62a of the photographed image determining section 62) are the same, and assumption of a subject by photographing information such as photographing position, photographing direction and the like and reference to the map database and the like that are performed in the photographing scene assuming subsection 62c are substantially the same. Therefore, detailed description of these functions are omitted, and processes after preparation of a simulation image in the photographing scene assuming subsection 62c will be mainly described.

As a presumption, photographed images of subjects such as well-known mountains, sightseeing places of interest and famous photographing spots are accumulated in the database subsection 62d of the photographed image determining section 62 as database accumulating images in advance.

First, in step S200, a subject is photographed by a camera 66 that is capable of making use of GPS information of a customer as in step S100. Here, GPS information and other various kinds of photographing information are recorded in the camera 66 together with an image of a photographing scene of the subject. Further, the camera 66 may be either a digital still camera or a conventional optical camera that makes use of a silver salt photograph film.

Then, in step S202, as in step S102, the image processing apparatus 14 reads a photographed image of the subject recorded in the camera 66 and the photographing information such as the GPS information that is supplementary information of the photographed image and stores them in the prescan memory 40 and the fine scan memory 42, and in the camera information acquiring subsection 62a of the photographed image determining section 62, respectively. Here, the photographed image and the photographing information are directly read from an image recording medium 25 in a case of a digital camera, or are read by a scanner 12 after developing a photographing film.

In step S204, the photographing scene assuming subsection 62c (more specifically the preparation part 63a; see FIG. 4) of the photographed image determining section 62 assumes a main subject from the GPS data using at least one of pieces of the camera information such as the acquired photographing position, photographing direction and photographing magnification and the like. At this point, as in the first aspect, the main subject can be assumed using database information such as the map database and the like of the database subsection 62d. Further, a main subject may be assumed by extracting a main subject by a conventionally well-known main subject extracting method, and then determining what the extracted main subject is.

Subsequently, in step S206, the preparation part 63a of the photographing scene assuming subsection 62c refers to the database subsection 62d, and retrieves and reads out a database accumulating image of the assumed main subject as the related information of the photographed image. It should be noted here that assumption of the main subject, and subsequent retrieval and reading out of a three-dimensional map image and a database accumulating image based on the above assumption that are performed in steps 204 and 206 in the preparation part 63a of the photographing scene assuming subsection 62c may be performed in the related information selecting subsection 62b.

Then, in step S208, the preparation part 63a of the photographing scene assuming subsection 62c prepares a simulation image based on the database accumulation image of the main subject read out as described above.

Subsequently, in step S210, the comparison part 63b of the photographing scene assuming subsection 62c compares the prepared simulation image and the photographed image read out from the fine scan memory 42 by matching and the like, and in step S212, the detection part 63c determines the presence of a dust, a tarnish or a noise based on the comparison results obtained in the comparison part 63b. That is, the comparison part 63b compares the photographed image of the customer and the simulation image, and for example, sizes or positions are matched by the local pattern matching. Thereafter, the detection part 63c determines that a dust, a tarnish or a noise exists, if a dot or a line in the photographed image that does not match the simulation image, that is, a dot or a line that does not exist originally, is detected.

The thus acquired information of a dust, a tarnish or a noise is sent from the photographing scene assuming subsection 62c (more specifically the detection part 63c) of the photographed image determining section 62 to the image processing subsection 54 of the fine scan processing section 46.

Lastly, in step S214, the image processing subsection 54 performs restoring processing based on the information of a dust, a tarnish or a noise sent from the photographing scene assuming subsection 62c of the photographed image determining section 62. That is, the image processing subsection 54 restores a dust, a tarnish or a noise in the photographed image using corresponding pixels of the simulation image or marginal pixels of the photographed image. The corresponding pixels of the photographed image that have been multiplied by a coefficient may be used in the restoring processing. The restoring processing may be performed in the photographing scene assuming subsection 62c of the photographed image determining section 62.

In this way, a dust, a tarnish or a noise in the photographed image can be efficiently restored, and quality of a reproduced print on which the photographed image is reproduced can be improved.

A second embodiment of the second aspect of the present invention will now be described, which prepares a simulation image of a photographing scene from camera information such as GPS information and three-dimensional map data, determines presence of a dust, a tarnish or a noise by matching with the simulation image, and performs restoring processing.

As a presumption, the three-dimensional map data is accumulated in the database part 626 of the photographed image determining section 62 as database information.

First, in this embodiment as well, as in the first embodiment, a subject is photographed by a camera 66, and camera information and the like such as GPS information are recorded in step S200. In step S202, photographed image is stored in the prescan memory 40 and the fine scan memory 42 of an image processing apparatus 14, and the camera information such as the GPS information is stored in the photographed image determining section 62.

In steps S204 and S206, the preparation part 63a of the photographing scene assuming subsection 62c in the photographed image determining section 62 refers to the database subsection 62d based on the acquired camera information such as photographing position, photographing direction (camera direction data) and the like, and reads out the three-dimensional map data accumulated therein. In step S208, the image determining subsection 62a of the photographed image determining section 62 prepares a simulation image of the photographed image from the acquired photographing position and photographing direction and the read out three-dimensional map data.

Subsequently, in step S210, the prepared simulation image and the photographed image are compared in the comparison part 63b, and in step S212, the detection part 63c determines that it as a dust, a tarnish or a noise if a line or the like exists in a region that is not the outline of the subject. For example, if lines continuing across different constructions exist in the photographed image of the client, the image determining subsection 62a considers it a tarnish on a film.

Lastly, in step S214, the image processing subsection 54 of the finely scanned processing section 46 performs restoring processing eased on the information of a dust, a tarnish and a noise sent from the photographing scene assuming subsection 62c of the photographed image determining section 62 in the same manner as in the first embodiment.

In this way, a dust, a tarnish or a noise in a photographed image can be efficiently restored, and a high quality reproduction print can be obtained without any affect of a dust, a tarnish or a noise.

A third embodiment of the second aspect of the present invention will now be described, which compares a database accumulating image corresponding to a photographing scene as a simulation image with a photographed image, detects a degree of marginal decreasing light or unevenness of sharpness, and performs restoring processing.

In this embodiment, a database accumulating image corresponding to a photographing scene is prepared as a simulation image in the preparation part 63a of the photographing scene assuming subsection 62c in the photographed image determining section 62. The processes from steps S200 to S210, that is until a photographed image is compared with the simulation image in the comparison part 63b, are performed in the same manner as in the first embodiment.

In step S212, the detection part 63c detects a degree of density unevenness such as marginal decreasing light or unevenness of unsharpness in an image of the photographing scene.

Lastly, in step S214, the image processing subsection 54 of the finely scanned image processing section 46 performs density unevenness correction or unsharpness correction with respect to the entire one frame of the photographing scene or a plurality of frames before and after the frame according to the degree of marginal decreasing light or unevenness of unsharpness sent from the photographing scene assuming subsection 62c (more specifically the detection part 63c) of the photographed image determining section 62, and performs restoration processing of the marginal decreasing light and the unevenness of unsharpness. Further, sharpening may be performed on only a specific subject that is extracted in advance.

In this way, density unevenness such as marginal decreasing light or unsharpness in a photographed image can be efficiently corrected, and quality of a reproduced print of a photographed image can be improved.

A fourth embodiment of the second aspect of the present invention will now be described, which assumes a position of a wire or an electric light pole in a photographed scene from camera information such as GPS information and map data of power supply related facilities by simulation, and performs erasing processing of the detected wire or electric light pole.

Here, as a presumption, map data of power supply related facilities showing positions of wires and electric light poles, and preferably their sizes as well is accumulated in the database subsection 62d, or can be retrieved through communication means such as the Internet.

First, in this embodiment as well, processes form step S200 to step S202, that is, until a photographed image and camera information such as GPS information are acquired in the same manner as in the second embodiment.

In steps S204 and S206, the photographing scene assuming subsection 62c (more specifically the preparation part 63a) of the photographed image determining section 62 refers to the database subsection 62d based on camera information such as an acquired photographing position and photographing direction (camera direction data), and reads out the map data of power supply related facilities accumulated therein. In step S208, the image determining subsection 62a of the photographed image determining section 62 prepares a simulation image assuming, for example, the positions and preferably the sizes of a wire and an electric light pole in a scene corresponding to the photographed image from the acquired photographing position and photographing direction and the read out map data of power supply related facilities.

Subsequently, in step S210, the comparison part 63b compares the simulation image showing the assumed positions and the estimated sizes of the wire and the electric light pole with the photographed image. In step S212, if a line or the like of the assumed size exists in the assumed positions of the wire and the electric light pole in the photographed image, the detection part 63c determines that the line is a wire or an electric light pole. For example, if a degree of matching is large between a detection result of a thin line in a photographed image of a customer and the assumed positions and the assumed sizes of the wire and the electric light pole of the simulation image, the image determining subsection 62a determines that the line is a wire or an electric light pole. Here, the detection of a thin line can be performed by the combination of known technologies such as filter processing, edge detection and tracing of a line.

Thereafter, in step S214, an image processing subsection 54 of a finely scanned image processing section 46 performs erasing processing of the line regarded as a wire or an electric light pole as unnecessary objects.

In this way, unnecessary objects such as a wire and an electric light pole in a photographed image can be efficiently erased, and a high quality print without any unnecessary objects can be reproduced.

Moreover, in the present invention, a main subject for preparing a simulation image may be assumed not only from GPS information but also from supplementary information such as comment information accompanying photographed image. For example, if photographing is performed in a well-known sightseeing place of interest, a main subject can be roughly assumed by the comment information, and can be limited by pattern matching with a database accumulating image. As an example of such comment information, there are text data, audio data and the like.

In each of the embodiments of the image processing method in accordance the second aspect of the present invention described above, image restoring processing can be efficient and accuracy of image restoration can be improved, and further, quality of a reproduced image can be improved by fulfillment of camera information such as GPS information and database accumulating images or map data, particularly three-dimensional map data.

In addition, in each of the above-described embodiments, efficiency of image restoration can be improved by full automation or semi-automation of the image restoring processing, for example, semi-automation in which a main subject is displayed on a monitor and the image restoring processing is left to determination of an operator.

The image processing methods according to the first and the second aspects of the present invention have been described showing various examples. However, it is needless to say that the present invention is not limited to the above-described examples, and various variations or alterations may be made without departing from the scope of the present invention. For example, while photographing position information is acquired from the GPS in the above-described embodiment, capturing means of position information is not limited to this, but may make use of a position information service by the PHS, or may be manually input by an operator.

As described above, in accordance with the first aspect of the present invention, the quality of a reproduced image such as a reproduced print can be improved further by assuming a photographing scene and specifying a subject, thereby distinguishing processing thereafter according to the scene.

In addition, in accordance with the second aspect of the present invention, restoration of a dust, a tarnish or a noise in a photographed image, correction of density unevenness and unsharpness; and removal of unnecessary objects can be efficiently performed, image restoration processing can be conducted efficiently as well as improving the accuracy of the image restoration, and quality of a reproduced image such as a reproduced print can be improved. This is attained by preparing a simulation image of a photographing scene, comparing the prepared simulation image with an image of the photographing scene. Further, in accordance with this embodiment, efficiency of image restoration can be improved by full automation or semi-automation of the image restoring processing, for example, semi-automation in which a main subject is displayed on a monitor and the image restoring processing is left to determination of an operator.

The image processing methods and apparatuses of the first and the second aspects of the present invention are basically configured as described above.

An image processing method and apparatus in accordance with the third aspect of the present invention will now be described showing preferred embodiments with reference to FIG. 6. Further, in a digital photoprinter 11 shown in FIG. 6, the image processing method of the third aspect of the present invention can be implemented. The digital photoprinter 11 shown in FIG. 6 has a configuration similar to that of the digital photoprinter 10 shown in FIG. 1. In addition, an information processing apparatus 15 shown in FIG. 6 may be used in the photoprinter 10 shown in FIG. 1 instead of the image processing apparatus 14 shown in FIG. 2, and has a configuration similar to that of the image processing apparatus 14. Thus, same reference numerals are given to same elements, and detailed description of the elements are omitted.

Figure 6:
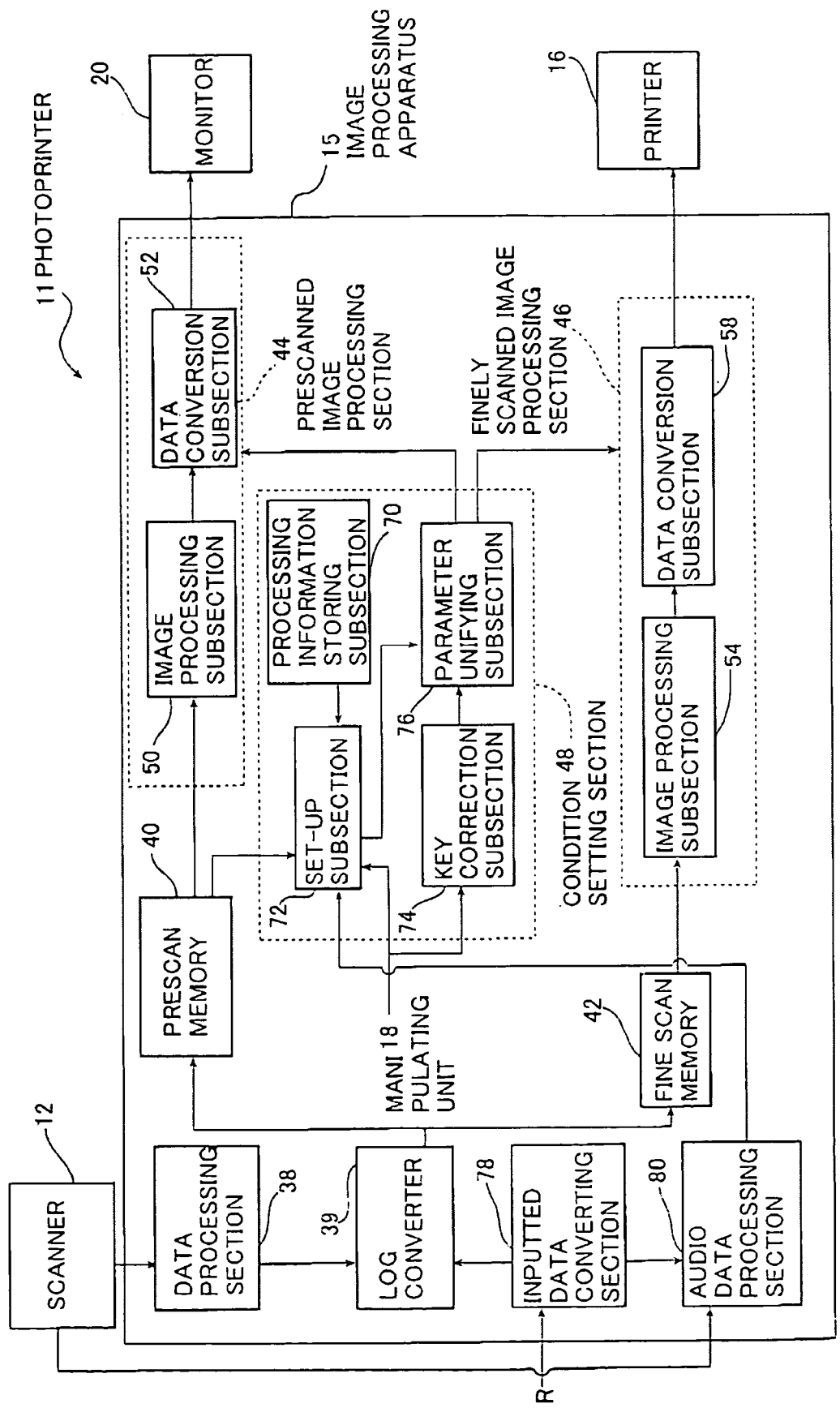
FIG. 6 is a block diagram of another example of a digital photoprinter that includes another embodiment of an image processing apparatus of the present invention.

FIG. 6 is a block diagram of one embodiment of the digital photoprinter 11 and the image processing apparatus 15 that is used therein.

As shown in FIG. 6, the image processing apparatus (hereinafter referred to as the processing apparatus) 15 basically comprises a data processing section 38, a Log converter 39, a prescan (frame) memory 40, a fine scan (frame) memory 42, a prescanned image processing section 44, a finely scanned image processing section 46, a condition setting section 48, an inputted data converting section 78, and an audio data processing section 80.

Image signals of R, G and B outputted form the scanner 12 is subject to predetermined data processing such as darkness correction, defective pixel correction, shading correction and so forth in the data processing section 48. Thereafter, the image signals are converted to digital image data (density data) by the Log converter 39, and prescanned data is recorded (stored) in the prescan memory 40 and finely scanned data is recorded (stored) in the fine scan memory 42, respectively.

On the other hand, an image (a digital image signal) supplied from an image data supplying source R such as the image recording medium 25 and its drive unit 26, as well as the slot 27 connected through communication network such as the Internet (see FIG. 1 for these elements) is converted to an image signal having a number of pixels (pixel density) corresponding to a prescan and a fine scan by known processing such as curtailing and interpolation (that is, two image signals are generated) by the inputted data converting section 78. Then, the image signal is converted to an image signal corresponding to the processing apparatus 15, then sent to the Log converter 39, and thereafter converted to prescanned data and finely scanned data in the similar manner, and stored in the prescan memory 40 and the fine scan memory 42.

Here, in recent years, digital (still) cameras (DSC) with a recording function are increasing in number, and in some case, audio data recorded at the time of photographing accompanies an image (an image file). In addition, audio data accompanies an image photographed by a digital video camera.

Further, a magnetic recording medium is formed in a film of the Advanced Photo System APS, which enables recording of audio data in a magnetic recording medium of each frame.

Here, this embodiment uses audio data or other camera information inputted or acquired in a camera as message information of a photographing scene thereby assuming the photographing scene from the message information on the photographing scene, and performing image processing corresponding to the scene.

The message information is exemplified by audio data recording voices sounded by a photographer and the like at the time of photographing with, for example, a digital camera having a voice recording function. That is, message information may not necessarily indicate a scene itself, but may be emotional words such as "Oh, beautiful" that is involuntarily sounded when seeing a beautiful woman or a flower, or congratulatory words and the like such as "Congratulations" that is sounded on an occasion of photographing at a wedding ceremony. Naturally, it may be a proper noun indicating a subject itself. In a case of a digital camera having a voice recording function, when a photographer speaks, spoken words are automatically recorded, and message information is inputted as audio data even if the photographer is not specifically aware.

Moreover, message information is not limited to audio data, but may be text data as far as it can be inputted without making a photographer aware of it at the time of photographing. For example, messages such as "indoor", "night" and "scenery" may be recorded automatically in each frame of a film based on presence or absence of strobe light, photographing distance and the like at the time of photographing without a photographer being aware that the message is recorded.

In addition, in a case in which a recording function is given to a camera adopting the Advanced Photo System APS, it is sufficient to record audio data in the magnetic recording medium as magnetic information at the time of photographing, read the audio data by reading the magnetic information at the time of preparing a print, and supply the read audio data to the image processing apparatus 15.

As described in detail below, in this embodiment, if an image accompanied by audio data is supplied, a photographing scene of a frame is assumed from message information that is the audio data, and image processing corresponding to the scene is subjected to the frame.

If audio data accompanies an image supplied from an image supplying source R such as a digital camera, a digital video camera, an image recording medium, a communication network and the like, an inputted data converting section 78 sends an image signal to the Log converter 39 as described previously and, at the same time, supplies the accompanying audio data to an audio data processing section 80.

On the other hand, magnetic information stored in a magnetic recording medium of the Advanced Photo System APS and read by the scanner 12 (carrier) is also supplied to the audio data processing section 80, which extracts audio data from the magnetic information.

The audio data processing section 80 having received the audio data (message information) accompanying each frame, recognizes contents of the audio data, distinguishes (assumes) a photographing scene of each frame, and sends information on the assumed scene to a condition setting section 48.

Further, if the supplied image is an animation photographed by a digital video camera or the like, the inputted data converting section 78 divides the image (image data) by a unit of a series of voices or a preset section, associates image data of a representative plurality of frames with the audio data among the voice outputs, and sends the data to the Log converter 39 and the audio data processing section 80.

The prescanned data stored in the prescan memory 40 is read and processed by the prescanned image processing section 44 having an image data processing subsection 50 (hereinafter referred to as the processing subsection 50) and an image data converting subsection 52, whereas the finely scanned data stored in the fine scan memory 42 is read and processed by the finely scanned image processing section 46 having an image data processing subsection 54 (hereinafter referred to as the processing subsection 54) and an image data conversion subsection 58.

The processing subsection 50 of the prescanned image processing section 44 and the processing subsection 54 of the finely scanned image processing section 46 perform basically the same processing except that each of the processing subsections has different resolution in a part in which preset image processing is subjected to an image (image data) read by the scanner 12 according to processing conditions set by the condition setting section 48 to be hereinafter described.

Image processing by both the processing subsections have no specific limitation and known various kinds of image processing exemplifies the processing. For example, gray balance adjustment using an LUT (look-up table), gradation correction and density (brightness) adjustment, photographing light source kind correction and saturation adjustment (color adjustment) of an image by a matrix (MTX), and, electronic variable magnification processing, dodging processing (compression/extension of density dynamic range), sharpness (sharpening) processing and the like using averaging processing and interpolation of low pass filter, adder, LUT, MTX, and the like or an appropriate combination or those exemplify the image processing.

Conditions of each of these image processing are set using prescanned data in the condition setting section 48.

The image data conversion subsection 58 converts image data (image data of a main print) processed by the processing subsection 54 using, for example, the 3-D (three dimensional)-LUT and the like, and supplies the converted data to a printer 16 as image data corresponding to an image record by the printer 16.

The image data conversion subsection 52 curtails as necessary an image data processed by the processing subsection 50 of the prescanned image processing section 44 and converts the data using the 3-D-LUT and the like in the similar manner, and supplies the converted data to a monitor 20 as image data or display on the monitor 20. Processing conditions in this case are set by the condition setting section 48 using prescan data.

The condition setting section 48 sets reading conditions of fine scan, and various kinds of processing conditions in the prescanned image processing section 44 and the finely scanned image processing section 46.

The condition setting section 48 has a set-up subsection 72, a key correction subsection 74 and a parameter unifying subsection 76.

The set-up subsection 72 prepares a density histogram, calculates image characteristic amount such as an average density, highlight and shadow, and determines reading conditions of fine scan. Further, the set-up subsection 72 sets various kinds of image processing conditions in the prescanned image processing section 44 and the finely scanned processing section 46 such as preparation of an LUT, preparation of an MTX operation formula, calculation of a sharpness correction coefficient and the like for performing gray balance adjustment, gradation correction and density adjustment in accordance with an instruction and the like of an operator, in addition to the density histogram and the image characteristic amount, and supplies them to the parameter unifying section 76.

The key correction subsection 74 calculates a correction amount of an image in accordance with various kinds of instructions inputted by keys for correcting density (brightness), color, contrast, sharpness, saturation set in a keyboard 18a, and a mouse 18b, and supplies the correction amount to the parameter unifying subsection 76.

The parameter unifying subsection 76 receives the image processing conditions set by the set-up subsection 72, and sets them in predetermined parts in the prescanned image processing section 44 and the finely scanned image processing section 46. Further, the parameter unifying subsection 76 corrects (adjusts) the image processing conditions, resets the image processing conditions, sets image processing conditions for correction, and so forth in the prescanned image processing section 44 and the finely scanned processing section 46 in accordance with the correction amount calculated in the key correction subsection 74.

Here, in the photoprinter 11 making use of the image processing method in accordance with the present invention, if message information on a scene accompanies a frame (an image), the image processing conditions in the above-described processing subsection 54 (50) are set such that an image of the scene is properly finished according to the message information.

Image processing conditions corresponding to a scene assumed from the message information may be set, for example, using information of image processing conditions corresponding to the scene that is read out from a processing information storing subsection 70 that stores information of image processing conditions corresponding to a scene and is provided in the set-up subsection 72 as shown in FIG. 6.

Image processing conditions corresponding to a scene obtained from message information are not specifically limited, but may be properly set according to various kinds of scenes such that an image reproduced on an outputted print is preferably finished.

In addition, as described previously, a photographing scene is assumed from message information in the audio data processing section 80. The scene may be assumed, for example, by holding various kinds of words and scenes corresponding to the words and comparing a scene with words in audio data. For example, if there is a word such as the mountain so and so, or the highlands so and so, and a photographing distance (a subject distance) is long, a scene is assumed to be a "scenery". If there is a concrete name of a flower and the like and a photographing distance is short, it is assumed that a "flower" is photographed. If there is a word relating to a New Year such as a traditional Japanese kimono, first shrine and temple visit of the New Year, a New Year's gift or the like, and a photographing period is in or closer to a New Year, it is assumed that "formal attires of the New Year" is photographed. If there is a word such as a bride and a bridegroom, or congratulations, it is assumed that a scene is in a wedding ceremony and photographed indoors. Further, If a concrete name of a person is called, it is assumed that a person is photographed.

In addition, in assuming a scene, accuracy of scene assumption is improved if a scene is assumed by combining camera photographing information (a photographing date and time, an hour and minute, photographing magnification, distance, luminance and the like, or position information and the like by the GPS), various kinds of image characteristic amount (including face extraction results) and the like, in addition to message information.

Various kinds of image processing conditions are set such that, for example, if it is assumed that a person has been photographed from message information, the set-up subsection 72 extracts a face of a person by performing face extraction, and particularly so that skin color of the face area is beautifully finished. Generally, if there is a proper noun, main subject extraction is to be performed.

Here, there is no limitation concerning extraction method of a face region, and a known face extraction algorithm can be used. In addition, if a scene of "formal attires in the New Year" is assumed, clearness of a kimono in the torso part below a face is to be emphasized after extracting the face.

In addition, if a scene is assumed to be a "flower", clearness is emphasized as well.

Further, if a scene is assumed to be a "wedding ceremony", and if a scene is assumed to be indoors from a photographing distance, inadvertent extraction of a face can be prevented by intensifying different kind light source processing as a measure against golden folding screens that reflect strobe lights. Moreover, processing conditions with respect to a person is similar to the above.

In addition, other than the above, if a scene is assumed to be a "scenery", a gray balance correction table, an MTX operation formula or correct saturation and the like are set without performing light source kind correction and such that the color green and the sky are beautifully finished.

Moreover, if a scene is assumed to be a "nightscape" or "fireworks", a gradation correction table and the like are set such that an image has emphasized brightness and darkness with high contrast.

Furthermore, if a scene is assumed to be "indoors", an MTX operation formula for saturation correction and the like are set by subjecting light source kind correction rather strong as in the above-mentioned wedding ceremony.

Further, in assuming a scene, intensity of processing for each scene may be adjusted by rating likelihood of each scene instead of completely classifying (dividing into modes) scenes as described above. For this purpose, in a lab database, it is sufficient to set marks allocated to respective scenes in a classification of scenes for words included in message information, compare words in the message information for each frame (image) with the marks, and distribute a mark of each scene in the frame.

For example, if there is a word associated with fields and mountains such as "the mountain so and so" in message information of a certain frame, a mark for each scene is distributed to the frame such as 10 points to a scenery mode, two points to a flower mode and zero point to other modes. Then, actual image processing conditions add small amount of processing as the flower mode to processing as a scenery mode.

As a further example, if there is a word "congratulations", 10 points are given to a wedding ceremony mode, five points to a kimono mode (because a New Year or a coming-of-age ceremony are possible as well), two points to an indoor mode, and zero points to other modes. In addition, if there is a word "beautiful", 10 points are given to the flower mode 5 points to a women mode, five points to the kimono mode, two points to a fireworks mode, and so forth. Moreover, if there is a proper noun for a flower, 20 points are given to the flower mode. Although there seems to be many cases in which a proper noun of a flower is the same as a name of a woman, there is no problem in particular because the flower mode also set image processing conditions for emphasizing clearness. Furthermore, if there is a name of a person such as "Mr./Mrs. so and so", 20 points are given to a person mode, further if it is a name of a woman, 10 points are given to the women mode.

Further, in the rating, camera information, image characteristics amount such as scene density distribution, face extraction results and the like for each mode may be combined with the above rating to be rated. In addition, if recognition technology of message information becomes more advanced, since accuracy of scene assumption is improved by assuming not only words but also a scene from a context of a message, distribution of marks may be centralized in modes of a specific scene.

Incidentally, when a simultaneous printing with the Advanced Photo System APS is requested, an index print is attached which is one sheet of print on which all frames of images photographed on a film F are reproduced. There are some lab shops which attach a similar index print even to an ordinary 135 film as a courtesy.

In the image processing method of the present invention, an index print may be edited using message information given to each frame. That is, photographed image can be classified at a photographer's option, and convenience of arranging prints can be improved using a scene classification by the image processing method of the present invention.

In addition, it is also extremely effective to edit and classifying photographed images using such a scene classification when image data is outputted to various kinds of storage media such as a magnetic recording medium such as a floppy disc, an magneto optical recording medium such as an MO disc, and an optical recording medium such as a CD-ROM, or delivered through a communication network such as the Internet.

As described above, in accordance with this embodiment, a photographing scene can be assumed by recognizing message information accompanying a photographed image, particularly audio data, image processing corresponding to the scene can be subjected to the image, and quality of the image can be improved.

In addition, since words naturally spoken by a photographer and the like at the time of photographing are automatically recorded as message information, for example, by a digital camera and the like with a recording function, the photographer does not need to be aware of the recording of the message information at all, and improvement of image quality can be attained using the message information accompanying the image without making the photographer aware of the improvement of image quality.

Moreover, addition and the like of a digital video camera, a digital camera with voice recording function, a digital camera with character message recording function, or a comment data utilizing a personal computer after photographing are possible, and image quality can be improved making use of the information supplementary to the image.

Further, although image processing corresponding to a scene is subjected to a frame using message information, the audio data processing section 80 may further convert audio data accompanying each frame to character data, send the character data to the prescanned image processing section 44 (the processing subsection 50) and the finely scanned image processing section 46 (the processing subsection 54), and display the character converted from the audio data in the image. At this point, a style of writing and characters may be changed according to the number of characters and the like, or a representative word may be selected and reproduced. For example, a name of a person in the scene, a name of a place of a scenery or a name of a mountain and a building may be displayed.

Although the image processing method in accordance with the third embodiment of the present invention has been described, it is needless to say that the present invention is not limited to the above examples, and various improvements and modifications can be made without departing from the spirit and scope of the present invention.

As described in detail, in accordance with the third aspect of the present invention, improvement of image quality can be attained using message information accompanying an image without making a photographer aware of the improvement of image quality.

This invention being thus described, and it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An image processing method comprising the steps of:
    capturing digital image data of a photographing scene in which a first subject is photographed with a camera, as well as,
    capturing camera information of said photographing scene acquired or input in the camera when said first subject is photographed;
    obtaining related information related to said photographing scene based on at least one of said captured digital image data of said photographing scene and said captured camera information thereof;
    assuming said photographing scene by said camera information and said related information or by a combination with said digital image data, said camera information and said related information; and
    subjecting preset image processing to said digital image data depending on said assumed photographing scene, wherein
    said camera information of said photographing scene includes photographing information and photographing position information captured in said camera,
    said related information includes supplementary information relating to the camera information,
    said assuming step of the photographing scene is a step of specifying automatically said first subject in said photographing scene or assuming a photographing situation when said first subject is photographed from said camera information and said supplementary information or a combination with said digital image data, said camera information and said supplementary information,
    said preset image processing is first image processing depending on said specified first subject or said assumed situation, and
    said first image processing is subjected to said digital image data in a first region limited to said first subject that is automatically specified by said assuming step.

2. The image processing method according to claim 1, wherein said supplementary information includes map information.

3. The image processing method according to claim 1, wherein said photographing information includes information on photographing date and time and said supplementary information includes weather information, and wherein a situation of said photographing scene is assumed by specifying weather in a photographing location at the time of photographing from the information on photographing date and time and the photographing position information in said camera information, as well as the weather information in said supplementary information.

4. The image processing method according to claim 1, wherein said photographing information includes information on photographing date and time, and said supplementary information includes event information, and a situation of said photographing scene is assumed by specifying an event in a photographing location at the time of the photographing from the information on photographing date and time and the photographing position information in said camera information, as well as the event information in said supplementary information.

5. The image processing method according to claim 1, wherein at least one of gradation control of density of color, geometrical distortion correction, and emphasizing or smoothing processing is executed in said region limited to said specified first subject as said preset image processing.

6. The image processing method according to claim 1, wherein said processed image data obtained by subjecting said preset image processing to said digital image data is converted to at least one of print output image data outputted to a printer producing a print, media output image data utilized in recording to and reproducing from an image data recording medium and communication image data utilized in communicating via a communication device, and is output.

7. The image processing method according to claim 6, wherein subject-related information is derived from a database by means of the subject assumed from said camera information and said related information and utilized as at least one of additional information for compositing at the time of producing the print, additional information for reproducing at the time of reproducing on the image data recording medium and additional information for reproducing at the time of reproducing after receiving via the communication device.

8. The image processing method according to claim 1, wherein
    said photographing scene further includes at least one second subject different from said specified first subject in addition to said specified first subject,
    said assuming step further includes a step of specifying said at least one second subject in said photographing scene from said camera information and said supplementary information of said combination, said preset image processing further includes at least one second image processing depending on said specified at least one second subject of said assumed situation in addition to said first image processing, and
said at least one second image processing is further subjected to said digital image data in at least one second region limited to said specified at least one second subject as said preset image processing.

9. The image processing method according to claim 1, wherein said first subject is a principal subject or a background.

10. The image processing method according to claim 1, wherein said assuming step of the photographing scene includes a step of a subject extracting step of extracting automatically said first subject and said first subject region limited to said first subject,
said first image processing is subjected to said digital image data in a first region limited to said first subject that is specified by said assuming step.

11. An image processing method comprising the steps of:
capturing digital image data of a photographing scene in which a subject is photographed with a camera, as well as,
capturing camera information of said photographing scene acquired or input in the camera when said subject is photographed;
obtaining related information related to said photographing scene based on at least one of said captured digital image data of said photographing scene and said captured camera information thereof;
assuming said photographing scene by at least one of said camera information and said related information or by a combination with said digital image data and said at least one of said camera information and said related information; and
subjecting preset image processing to said digital image data depending on said assumed photographing scene, wherein
said related information includes map information and/or accumulated images,
said camera information of said photographing scene includes at least one of photographing position information or photographing direction information and photographing magnification information captured in said camera,
said assuming step of the photographing scene comprises the steps of:
preparing a simulation image of said photographing scene using said camera information and said map information or said accumulated images;
comparing said prepared simulation image with a photographed image of said photographing scene; and
detecting a defective region or an unnecessary region in said photographed image of said photographing scene, and
said preset image processing step comprises a step of subjecting restoration processing to said defective region or said unnecessary region in said photographing image.

12. The image processing method according to claim 11, wherein said detecting step of said defective region or said unnecessary region is for determining a line or a point existing in said photographed image that does not match said simulation image as a result of comparing said simulation image with said photographed image; and
said restoring processing step is for restoring and erasing the determined line or point using corresponding pixels in said simulation image, or corresponding pixels or marginal pixels in said photographed image.

13. The image processing method according to claim 11, wherein said comparing step for comparing said simulation image with said photographed image is for comparing distribution of density and color or distribution of sharpness in a preset region within a picture of said photographing scene, between said simulation image and said photographed image;
said detecting step of said defective region or said unnecessary region is for detecting distortion in said distribution of density or color or said distribution of sharpness in said preset region; and
said restoring processing step is for correcting unevenness or unsharpness with respect to said preset region.

14. The image processing method according to claim 11, wherein said comparing step for comparing said simulation image and said photographed image is for dividing an entirety of a picture of said photographing scene into a plurality of sub-regions, and comparing distribution of density or color or distribution of sharpness for each of said plurality of sub-regions, between said simulation image and said photographed image;
said detecting step of said defective region or said unnecessary region is for detecting a sub-region in which said distribution of density and color or said distribution of sharpness has distortion out of said plurality of sub-regions; and
said restoring processing step is for correcting unevenness or unsharpness with respect to said region in which said distribution has distortion.

15. The image processing method according to claim 11, wherein said detecting step of said defective region or said unnecessary region is for deriving a region of a specific construction in said simulation image;
said comparing step of said simulation image with said photographed image is for setting a region that is the same as the region of said specific construction derived in said simulation image in said photographed image; and
said restoring processing step is for performing processing step is for performing processing for removing said specific construction from the same region set in said photocopied image.

16. The image processing method according to claim 11, wherein said processed image data obtained by subjecting said preset image processing to said digital image data is converted to at least one of print output image data outputted to a printer producing a print, media output image data utilized in recording to and reproducing from a image data recording medium and communication image data utilized in communicating via a communication device, and is output.

17. The image processing method according to claim 16, wherein subject-related information is derived from a database by means of the subject assumed from said camera information and said related information and utilized as at least one of additional information for compositing at the time of producing the print, additional information for reproducing at the time of reproducing on the image data recording medium and additional information for reproducing at the time of reproducing after receiving via the communication device.

18. An image processing method comprising the steps of:
capturing digital image data of a photographing scene in which a subject is photographed with a camera, as well as, capturing camera information of said photographing scene acquired or input in the camera when said subject is photographed;

assuming said photographing scene by said camera information or by a combination with said digital image data and said camera information; and subjecting preset image processing to said digital image data depending on said assumed photographing scene, wherein said camera information of said photographing scene includes a message information relating to said photographing scene, acquired or input in said camera and assigned to said digital image data, said assuming step of the photographing scene is a step of assuming the photographing scene from contents of said message information or a combination with said digital image data and said contents of said message information; and said preset image processing step is a step of subjecting image processing by means of image processing conditions set in accordance with the assumed photographing scene, and wherein said message information is audio information and said image processing conditions are used to image processing for obtaining a high quality image and set in accordance with said photographing scene assumed from at least said contents of said audio information in said assuming step.

19. The image processing method according to claim 18, wherein said message information further includes text information.

20. The image processing method according to claim 18, wherein said photographing scene is assumed by combining either of photographing information at the time of photographing, an image characteristics amount or principal subject information with said message information.

21. The image processing method according to claim 18, wherein said processed image data obtained by subjecting said preset image processing to said producing a print, media output image data utilized in recording to and reproducing from a image data recording medium and communication image data utilized in communicating via a communication device, and is output.

22. The image processing method according to claim 21, wherein subject-related information is derived from a database by means of the subject assumed from said camera information and said related information and utilized as at least one of additional information for compositing at the time of producing the print, additional information for reproducing at the time of reproducing on the image data recording medium and additional information for reproducing at the time of reproducing after receiving via the communication device.

23. The image processing method according to claim 18, wherein said message information is expressed by at least one word, and said photographing scene is assumed by interpreting said at least one word.

24. The image processing apparatus according to claim 18, wherein at least one of gradation control of density of color, geometrical distortion correction, and emphasizing or smoothing processing is executed in said region limited to said specified first subject as said preset image processing.

25. An image processing apparatus comprising:
an image data capturing device which captures digital image data of a photographed image in a camera capable of obtaining said photographed image of a photographing scene in which a first subject is photographed, as well as, acquiring or inputting camera information of said photographing scene when said first subject is photographed;

a camera information capturing device which captures said camera information of said photographing scene acquired and input in the camera;

a database which stores related information related to said digital image data of the photographing scene and said camera information;

an obtaining device which obtains said related information related to said photographing scene and acquired or input in the camera, or stored in said database, based on said digital image data of said photographing scene and said captured camera information thereof, an assuming device which assumes said photographing scene by said camera information and said related information of the photographing scene or by a combination with said digital image data, said camera information and said related information; and an image processing device which subjects preset image processing to said digital image data depending on said assumed photographing scene; wherein said camera information capturing device captures photographing information and photographing position information captured in said camera as said camera information of said photographing scene, said obtaining device which obtains supplementary information relating to the camera information as said related information, said assuming device specifies automatically said first subject in said photographing scene or assumes a photographing situation when said first subject is photographed from said camera information and said supplementary information or a combination with said digital image data said camera information and said supplementary information, and said image processing device subjects image processing depending on said specified first subject or said assumed situation as said preset image processing to said digital image data in a region limited to said first subject that is automatically specified by said assuming device.

26. The image processing apparatus according to claim 25, wherein said supplementary information includes map information.

27. The image processing apparatus according to claim 25, wherein said photographing information includes information on photographing date and time and said supplementary information includes weather information, and said assuming device assumes a situation of said photographing scene by specifying weather in a photographing location at the time of photographing from the information on photographing date and time and the photographing position information in said camera information, as well as the weather information in said supplementary information.

28. The image processing apparatus according to claim 25, wherein said photographing information includes information on photographing date and time, and said supplementary information includes event information, and said assuming device assumes a situation of said photographing scene by specifying an event in a photographing location at the time of photographing from the information on photographing date and time and the photographing position information in said camera information, as well as the event information in said supplementary information.

29. The image processing apparatus according to claim 25, wherein said image processing device further executes at least one of gradation control of density of color, geometrical distortion correction, and emphasizing or smoothing processing in said region limited to said specified first subject as said preset image processing.

30. The image processing apparatus according to claim 25, further comprising;
a converting device which converts said processed image data obtained by subjecting said preset image processing to said digital image data to at least one of print output image data outputted to a printer producing a print, media output image data utilized in recording to and reproducing from a image data recording medium and communication image data utilized in communicating via a communication device, and is output.

31. The image processing apparatus according to claim 30, wherein said obtaining device derives subject-related information from said database by means of the subject assumed from said camera information and said related information by said assuming device,
said apparatus further comprising an information adding device which adds said subject-related information derived by said obtaining device, based on said converted image data by said converting device, as at least one of additional information for compositing at the time of producing the print, additional information for reproducing at the time of reproducing on the image data recording medium and additional information for reproducing at the time of reproducing after receiving via the communication device.

32. The image processing apparatus according to claim 25, wherein
said photographing scene further includes at least one second subject different from said specified first subject in addition to said specified first subject,
said assuming device further specifies said at least one second subject in said photographing scene from said camera information and said supplementary information or said combination, and
said image processing device further subjects at least one second image processing depending on said specified at least one second subject or said assumed situation as said preset image processing to said digital image data in at least one second region limited to said specified at least one second subject.

33. The image processing apparatus according to claim 25, wherein said first subject is a principal subject or a background.

34. The image processing apparatus according to claim 25, wherein said assuming device includes a device for extracting automatically said first subject and said first region limited to said first subject by a subject extracting method.

35. An image processing apparatus comprising:
an image data capturing device which captures digital image data of a photographed image in a camera capable of obtaining said photographed image of a photographing scene in which a subject is photographed, as well as, acquiring or inputting camera information of said photographing scene when said subject is photographed;
a camera information capturing device which captures said camera information of said photographing scene acquired or input in the camera;
a database which stores related information related to said digital image data of the photographing scene and said camera information;
an obtaining device which obtains said related information related to said photographing scene and acquired or input in the camera, or stored in said database, based on said digital image data of said photographing scene and said captured camera information thereof,
an assuming device which assumes said photographing scene by said camera information and said related information of the photographing scene or by a combination with said digital image data, said camera information and said related information; and
an image processing device which subjects preset image processing to said digital image data depending on said assumed photographing scene; wherein
said obtaining device obtains map information and or accumulated images related to said camera information as said related information,
said camera information capturing device captures at least one of photographing position information or photographing direction information and photographing magnification information captured in said camera as said camera information of said photographing scene,
said assuming device comprises:
a preparing device which prepares a simulation image of said photographing scene using said camera information, and said map information or said accumulated images;
a comparing device which compares said simulation image prepared by said preparing device with a photographed image of said photographing scene; and
a detecting device which detects a defective region or an unnecessary region in said photographed image of said photographing scene, and
said image processing device comprises a restoration processing device which subjects restoration processing to said defective region or said unnecessary region in said photographing image as said preset image processing.

36. The image processing apparatus according to claim 35, wherein said detecting device determines a line or a point existing in said photographed image that does not match said simulation image as a result of comparing said simulation image with said photographed image; and
said restoring processing device restores and erases the determined line or point using corresponding pixels in said simulation image, or corresponding pixels or marginal pixels in said photographed image.

37. The image processing apparatus according to claim 35, wherein said comparing device compares distribution of density and color or distribution of sharpness in a preset region within a picture of said photographing scene, between said simulation image and said photographed image;
said detecting device detects distortion in said distribution of density or color or said distribution of sharpness in said preset region; and
said restoring processing device corrects unevenness or unsharpness with respect to said preset region.

38. The image processing apparatus according to claim 35, wherein said comparing device divides an entirety of a picture of said photographing scene into a plurality of sub-regions, and compares distribution of density or color or distribution sharpness for each of said plurality of sub-regions, between said simulation image and said photographed image;

said detecting device detects a sub-region in which said distribution of density and color or said distribution of sharpness has distortion out of said plurality of sub-regions; and said restoring processing device corrects unevenness or unsharpness with respect to said region in which said distribution has distortion.

39. The image processing apparatus according to claim 35, wherein said detecting device derives a region of a specific construction in said simulation image;

said comparing device sets a region that is the same as the region of said specific construction derived in said simulation image in said photographed image; and said restoring processing device performs processing for removing said specific construction from the same region set in said photographed image.

40. The image processing apparatus according to claim 35, further comprising:

a converting device which converts said processed image data obtained by subjecting said preset image processing to said digital image data to at least one of print output image data outputted to a printer producing a print, media output image data utilized in recording to and reproducing from a image data recording medium and communication image data utilized in communicating via a communication device, and is output.

41. The image processing apparatus according to claim 40, wherein said obtaining device derives subject-related information from said database by means of the subject assumed from said camera information and said related information by said assuming device, said apparatus further comprising an information adding device which adds said subject-related information derived by said obtaining device, based on said converted image data by said converting device, as at least one of additional information for compositing at the time of producing the print, additional information for reproducing at the time of reproducing on the image data recording medium and additional information for reproducing at the time of reproducing after receiving via the communication device.

42. An image processing apparatus comprising:

an image data capturing device which captures digital image data of a photographed image in a camera capable of obtaining said photographed image of a photographing scene in which a subject is photographed, as well as, acquiring or inputting camera information of said photographing scene when said subject is photographed;

a camera information capturing device which captures said camera information of said photographing scene acquired or input in the camera;

an assuming device which assumes said photographing scene by said camera information or by a combination with said digital image data and said camera information; and an image processing device which subjects preset image processing to said digital image data depending on said assumed photographing scene, wherein said camera information capturing device captures message information relating to said photographing scene, acquired or input in said camera and assigned to said digital image data, said assuming device assumes the photographing scene from contents of said message information or a combination with said digital image data and said contents of said message information; and said image processing device subjects image processing by means of image processing conditions set in accordance with the assumed photographing scene, and wherein said message information is audio information and said image processing conditions are used to image processing for obtaining a high quality image and set in accordance with said photographing scene assumed from at least said contents of said audio information in said assuming step.

43. The image processing apparatus according to claim 42, further comprising:

a database which stores related information related to said digital image data of the photographing scene and said camera information; and an obtaining device which obtains said related information related to said photographing scene and acquired or input in the camera, or stored in said database, based on said digital image data of said photographing scene and said captured camera information thereof; wherein said assuming device assumes said photographing scene by said related information of the photographing scene or by a combination with said related information and at least one of said camera information and said digital image data.

44. The image processing apparatus according to claim 43, further comprising:

a converting device which converts said processed image data obtained by subjecting said preset image processing to said digital image data to at least one of print output image data outputted to a printer producing a print, media output image data utilized in recording to and reproducing from a image data recording medium and communication image data utilized in communicating via a communication device, and is output.

45. The image processing apparatus according to claim 44, wherein said obtaining device derives subject-related information from said database by means of the subject assumed from said camera information and said related information by said assuming device, said apparatus further comprising an information adding device which adds said subject-related information derived by said obtaining device, based on said converted image data by said converting device, as at least one of additional information for compositing at the time of producing the print, additional information for reproducing at the time of reproducing on the image data recording medium and additional information for reproducing at the time of reproducing after receiving via the communication device.

46. The image processing apparatus according to claim 42, wherein said message information further includes text information.

47. The image processing apparatus according to claim 42, wherein said assuming device assumes said photographing scene by combining either of photographing information at the time of photographing, an image characteristics amount of principal subject information with said message information.

48. The image processing apparatus according to claim 42, wherein said message information is expressed by at least one word, and said assuming device assumes said photographing scene by interpreting said at least one word.

49. The image processing apparatus according to claim 42, wherein said image processing device executes at least one of gradation control of density of color, geometrical distortion correction, and emphasizing or smoothing processing in said region limited to said specified first subject as said preset image processing.

50. An image processing method, comprising the steps of:

capturing digital image data of a photographing scene in which a subject is photographed with a camera, as well as, capturing camera information of said photographing scene acquired or input in the camera when said subject is photographed;

assuming said photographing scene by said camera information or by a combination with said digital image data and said camera information; and subjecting preset image processing to said digital image data depending on said assumed photographing scene, said camera information of said photographing scene includes information on photographing date and time, and photographing position information captured in said camera, said assuming step of the photographing scene is a step of specifying automatically said subject in said photographing scene and assuming a photographing situation when said subject is photographed from said information on said photographing date and time, and said photographing position information of said camera information or a combination with said digital image data, said information on said photographing date and time, and said photographing position information, and said preset image processing is image processing depending on said specified subject and said assumed situation and is subjected to said digital image data in a region limited to said subject that is automatically specified by said assuming step.

51. An image processing apparatus, comprising:

an image data capturing device which captures digital image data of a photographed image in a camera capable of obtaining said photographed image of a photographing scene in which a subject is photographed, as well as, acquiring or inputting camera information of said photographing scene when said subject is photographed;

a camera information capturing device which captures said camera information of said photographing scene acquired or input in the camera;

an assuming device which assumes said photographing scene by said camera information or by a combination with said digital image data and said camera information; and an image processing device which subjects preset image processing to said digital image data depending on said assumed photographing scene; wherein said camera information capturing device captures information on photographing date and time, and photographing position information captured in said camera as said camera information of said photographing scene, said assuming device specifies automatically said subject in said photographing scene and assumes a photographing situation when said subject is photographed from said information on said photographing date and time, and said photographing position information of said camera information or a combination with said digital image data, said information on said photographing date and time, and said photographing position information, and said image processing device subjects image processing depending on said specified subject and said assumed situation as said preset image processing to said digital image data in a region limited to said subject that is automatically specified by said assuming device.

52. An image processing method, comprising the steps of:

capturing digital image data of a photographing scene in which a subject is photographed with a camera, as well as, capturing camera information of said photographing scene acquired or input in the camera when said subject is photographed;

assuming said photographing scene by said camera information or by a combination with said digital image data and said camera information; and subjecting preset image processing to said digital image data depending on said assumed photographing scene, wherein said capturing step of capturing said camera information of said photographing scene is a step of capturing a message information relating to said photographing scene, acquired or input in said camera at a same time when the digital image data is captured and assigned to said digital image data, such that the message information is being stored until it is used, said assuming step of the photographing scene is a step of assuming the photographing scene from contents of said message information or a combination with said digital image data and said contents of said message information; and said preset image processing step is a step of subjecting image processing by means of image processing conditions set in accordance with the assumed photographing scene, and wherein said photographing scene is assumed by combining principal subject information with said message information.

53. The image processing method according to claim 52, wherein said photographing scene is assumed by combining said principal subject information and either of photographing information at the time of photographing or an image characteristics amount with said message information.

54. The image processing method according to claim 52, wherein said message information is expressed by at least one word, and said photographing scene is assumed by interpreting said at least one word.

55. An image processing apparatus, comprising:

an image data capturing device which captures digital image data of a photographed image in a camera capable of obtaining said photographed image of a photographing scene in which a subject is photographed, as well as, acquiring or inputting camera information of said photographing scene when said subject is photographed;

a camera information capturing device which captures said camera information of said photographing scene acquired or input in the camera;

an assuming device which assumes said photographing scene by said camera information or by a combination with said digital image data and said camera information; and an image processing device which subjects preset image processing to said digital image data depending on said assumed photographing scene, wherein said camera information capturing device captures message information relating to said photographing scene, acquired or input in said camera at a same time when the digital image data is captured and assigned to said digital image data, such that the message information is stored in the image data capturing device until it is used, said assuming device assumes the photographing scene from contents of said message information or a combination with said digital image data and said contents of said message information as well as by combining principal subject information with said message information; and said image processing device subjects image processing by means of image processing conditions set in accordance with assumed photographing scene.

56. The image processing apparatus according to claim 55, wherein said assuming device assumes said photographing scene by combining said principal subject information and either of photographing information at the time of photographing or an image characteristics amount with said message information.

57. The image processing apparatus according to claim 55, wherein said message information is expressed by at least one word, and said assuming device assumes said photographing scene by interpreting said at least one word.

* * * * *